(12) United States Patent
Thakare et al.

(10) Patent No.: US 12,294,093 B2
(45) Date of Patent: May 6, 2025

(54) MULTIPHASE COMPOSITES INCLUDING SILICA AND MAGNELI-PHASE TITANIUM SUBOXIDES

(71) Applicant: Energy and Environmental Research Center Foundation, Grand Forks, ND (US)

(72) Inventors: Jivan Thakare, Grand Forks, ND (US); Jahangir Masud, Grand Forks, ND (US)

(73) Assignee: Energy and Environmental Research Center Foundation, Grand Forks, ND (US)

( * ) Notice: Subject to any disclaimer, the term of this patent is extended or adjusted under 35 U.S.C. 154(b) by 357 days.

(21) Appl. No.: 17/933,311

(22) Filed: Sep. 19, 2022

(65) Prior Publication Data

US 2023/0088123 A1    Mar. 23, 2023

Related U.S. Application Data

(60) Provisional application No. 63/261,484, filed on Sep. 22, 2021.

(51) Int. Cl.
*H01M 4/92* (2006.01)
*H01M 8/1004* (2016.01)

(52) U.S. Cl.
CPC ......... *H01M 4/925* (2013.01); *H01M 8/1004* (2013.01); *H01M 2300/0065* (2013.01)

(58) Field of Classification Search
CPC ............... H01M 4/925; H01M 8/1004; H01M 2300/0065
See application file for complete search history.

(56) References Cited

U.S. PATENT DOCUMENTS

2020/0112032 A1*  4/2020  Moghadam Esfahani ................... H01M 4/8803

FOREIGN PATENT DOCUMENTS

| CN | 102849794 | 1/2013 |
| JP | 2016081584 | 5/2016 |
| JP | 2016081584 A * | 5/2016 |

OTHER PUBLICATIONS

Fukushima et al., Size Control of Ti4O7 Nanoparticles by Carbothermal Reduction Using a Multimode Microwave Furnace, 2018, Crystals, 8, 1-8 (Year: 2018).*
"European Application Serial No. 22196650.0, Extended European Search Report mailed Jan. 25, 2023", 9 pgs.
Kuroda, Yoshiyuki, "Templated Synthesis of Carbon-Free Mesoporous Magneli-Phase Titanium Suboxide", Electrocatalysis, Springer US, Boston, vol. 10, No. 5, (Jun. 25, 2019), 459-465.
"European Application Serial No. 22196650.0, Response filed Sep. 29, 2023 to Extended European Search Report mailed Jan. 25, 2023", 16 pgs.
"European Application Serial No. 22196650.0, Communication Pursuant to Article 94(3) EPC mailed Oct. 14, 2024", 6 pgs.
"European Application Serial No. 22196650.0, Response filed Feb. 10, 2025 to Communication Pursuant to Article 94(3) EPC mailed Oct. 14, 2024", 9 pgs.

* cited by examiner

*Primary Examiner* — Daniel S Gatewood
(74) *Attorney, Agent, or Firm* — Schwegman Lundberg & Woessner, P.A.

(57) ABSTRACT

Composites including silica phase and magneli-phase titanium suboxide, supported catalyst particles including the same, electrodes including the supported catalyst particles, and electrochemical cells including the electrode.

20 Claims, 16 Drawing Sheets

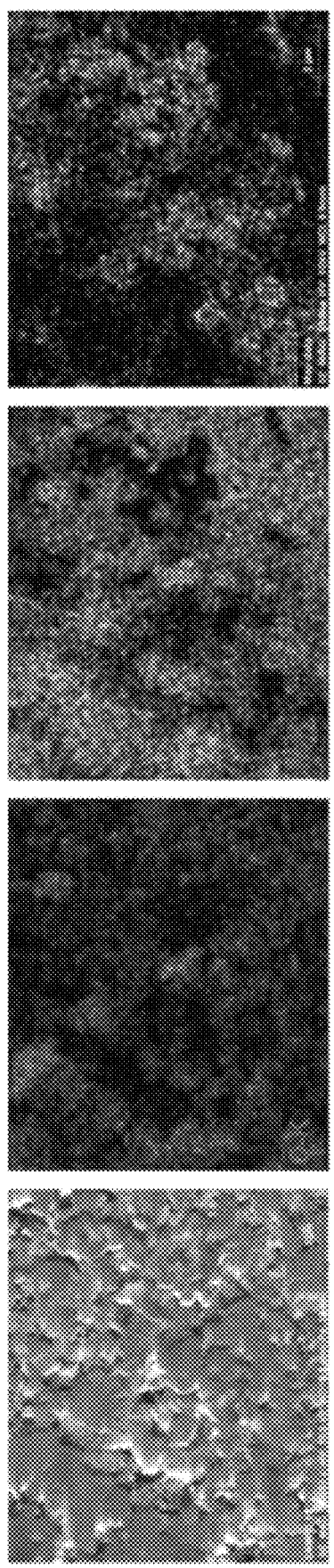
FIG. 3A MTO
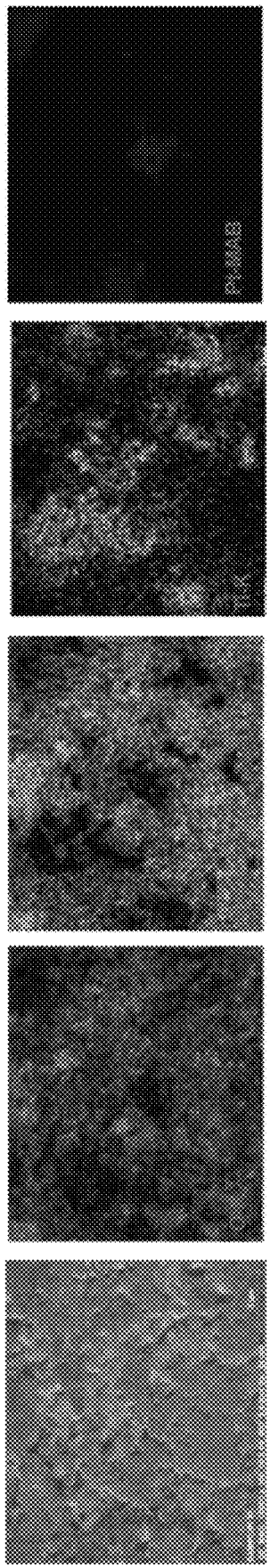
FIG. 3B Pt-MTO

MULTIPHASE COMPOSITES INCLUDING SILICA AND MAGNELI-PHASE TITANIUM SUBOXIDES

CROSS-REFERENCE TO RELATED APPLICATION

This application claims the benefit of priority to U.S. Provisional Patent Application Serial. No. 63/261,484 filed Sep. 22, 2021, the disclosure of which is incorporated herein in its entirety by reference.

STATEMENT OF GOVERNMENT SUPPORT

This invention was made with Government support under grants P20GM113123 and U54GM128729 awarded by the NIH. The U.S. Government has certain rights in this invention.

BACKGROUND

Proton exchange membrane fuel cells (PEMFCs) has drawn much attention as a promising energy source due to high conversion efficiency, high power density, high current density, and quick startup. The durability of catalysts in PEMFCs is an important issue that must be addressed before their widespread commercialization, since catalyst durability directly reflects the life and cost of fuel cell power-generation systems. Carbon black has been the most used support material because of the high surface area, low cost, and easy availability. Although many factors could play a role in the mechanism of catalyst degradation, the major contributors are believed to be i) dissolution of Pt and re-deposition (Ostwald ripening), ii) coalescence via crystal migration, and iii) detachment of Pt particles from the carbon support. Among these, Pt detachment is strongly affected by corrosion of the carbon support materials. Conventional carbon blacks, such as Vulcan XC72, are superior catalyst-support materials because of their cost and physicochemical properties. However, carbon is not stable based on thermodynamic considerations under the cathodic operation in a PEMFC (e.g., $C+H2O \rightarrow CO2+2H^{+}+2e^{-}$ has $E^{0}=0.207$ V vs. RHE).

To solve the issue of carbon corrosion, extensive studies have been made on adopting Materials with high corrosion resistance, including the carbon support with greater degree of graphitization. There are many types of carbon-based materials that have been studied such as nanotube, nanofiber, graphene, nanodiamond, and mesoporous structure. Although those forms of nanostructured carbon with higher graphitization degree have higher corrosion resistance than carbon black, it is still hard for them to avoid corrosion under long-term operation because they are intrinsically composed of carbon.

SUMMARY OF THE INVENTION

The present invention provides a composite including a silica phase and a titanium magneli phase.

The present invention provides a composite including a silica phase and a titanium magneli phase. The titanium magneli phase and the silica phase are each distinct discontinuous particulate crystalline phases in the composite. The silica phase includes $SiO_2$. The compound $Ti_6O_{11}$ is 30 wt % to 100 wt % of the titanium magneli phase. The silica phase is 40 wt % to 60 wt % of the composite. The silica phase has a mean particle size of 10 nm to 60 nm. The titanium magneli phase is 40 wt % to 60 wt % of the composite. The titanium magneli phase has a mean particle size of 1 nm to 30 nm.

The present invention provides an electrode. The electrode includes supported catalyst particles. The supported catalyst particles including a composite that includes a silica phase and a titanium magneli phase. The supported catalyst particles also include catalyst particles that are homogeneously distributed in the composite.

The present invention provide an electrode. The electrode includes supported platinum particles. The supported platinum particles include a composite including a silica phase and a titanium magneli phase. The titanium magneli phase and the silica phase are each distinct discontinuous particulate crystalline phases in the composite. The silica phase includes $SiO_2$. The compound $Ti_6O_{11}$ is 30 wt % to 100 wt % of the titanium magneli phase. The silica phase is 40 wt % to 60 wt % of the composite. The silica phase has a mean particle size of 10 nm to 60 nm. The titanium magneli phase is 40 wt % to 60 wt % of the composite. The titanium magneli phase has a mean particle size of 1 nm to 30 nm. The supported platinum particles also include platinum particles that are homogeneously distributed in the composite.

The present invention provides an electrochemical cell. The electrochemical cell includes an anode, a cathode, and a proton-exchange membrane between the anode and cathode. One or both of the anode and the cathode include supported catalyst particles. The supported catalyst particles include a composite that includes a silica phase and a titanium magneli phase. The supported catalyst particles also include catalyst particles that are homogeneously distributed in the composite.

The present invention provides a fuel cell. The fuel cell includes an anode, a cathode, and a proton-exchange membrane between the anode and cathode. One or both of the anode and cathode include supported platinum particles. The supported platinum particles include a composite that includes a silica phase and a titanium magneli phase. The silica phase and the titanium magneli phase are each distinct particulate crystalline phases in the composite. The supported platinum particles also include platinum particles homogeneously distributed in the composite.

The present invention provides a method of making a composite. The method includes combining $SiO_2$ and $TiO_2$ to form a mixture. The method also includes reducing the mixture to form the composite.

The present invention provides a method of making an electrode. The method includes combining catalyst particles and a composite that includes a silica phase and a titanium magneli phase, to form supported catalyst particles. The method can also include combining one or more ionomeric polymers with the supported catalyst particles, to form the electrode.

The present invention provides a method of using the electrochemical cell of the present invention described herein. The method includes generating or applying a voltage across the anode and the cathode of the electrochemical cell.

In various aspects, the composite, supported catalyst particles, and/or electrode of the present invention can provide various advantages. For example, although magneli-phase titanium suffers from poor electrochemical surface area, in various aspects, the composite of the present invention including the silica phase and the titanium magneli phase has excellent electrochemical surface area that can exceed the electrochemical surface area of other supported electrode catalyst materials, such as other supported platinum materials (e.g., Pt/C (platinum supported on carbon)). Although silica suffers from poor conductivity, in various aspects, the composite of the present invention including the silica phase and the titanium magneli phase as excellent conductivity that can exceed the conductivity of other supported electrode catalyst materials, such as other supported platinum materials (e.g., Pt/C (platinum supported on carbon)). In various aspects, the composite of the present invention can have good resistance to degradation and/or corrosion, with less decrease in electrochemical surface area over the same number of cycles as compared to other supported electrode catalyst materials, such as other supported platinum materials (e.g., Pt/C (platinum supported on carbon)). In various aspects, the composite of the present invention can be a lower cost material than other electrochemical cell catalyst support materials. In various aspects, the composite of the present invention can have an increased optical band gap over that of titania, providing a better material for photocatalytic applications than titania.

BRIEF DESCRIPTION OF THE FIGURES

The drawings illustrate generally, by way of example, but not by way of limitation, various embodiments of the present invention.

FIG. 3A illustrates EDS mapping for MTO, in accordance with various embodiments.

FIG. 3B illustrates EDS mapping for Pt/MTO, in accordance with various embodiments.

DETAILED DESCRIPTION OF THE INVENTION

Figure 1:
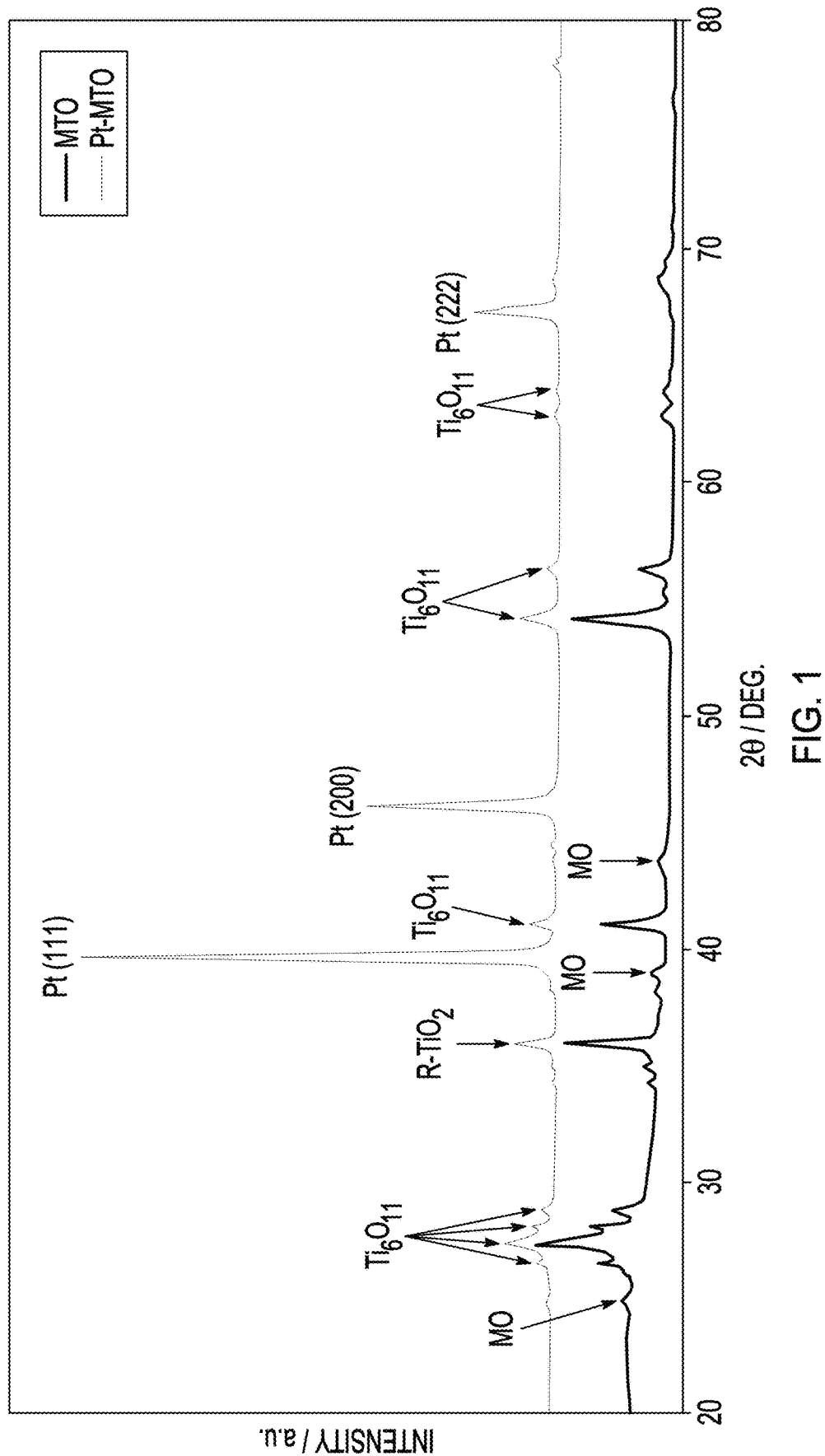
FIG. 1 illustrates an XRD spectrum of $SiO_2$—$Ti_xO_{2x-1}$ (MTO) and Pt/MTO, in accordance with various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

Composite

The present invention provides a composite including a silica phase and a titanium magneli phase. The silica phase includes $SiO_2$ and the titanium magneli phase includes magneli-phase titanium suboxide. The composite can be in any suitable form, such as particles, flakes, a coating, chunks, or the like.

The silica phase includes $SiO_2$, such as 90 wt % to 100 wt % $SiO_2$, or 99 wt % to 100 wt % $SiO_2$, or greater than or equal to 90 wt %, 91, 92, 93, 94, 95, 96, 97, 98, 99, 99.5, 99.9, 99.99, or 99.999 wt %. The silica phase can form any suitable proportion of the composite. The silica phase can be 10 wt % to 90 wt % of the composite, or 40 wt % to 60 wt % of the composite, or less than or equal to 90 wt % and greater than or equal to 10 wt %, 15, 20, 25, 30, 35, 40, 42, 44, 46, 48, 50, 52, 54, 56, 58, 60, 65, 70, 75, 80, or 85 wt %.

The titanium magneli phase can be any suitable proportion of the composite, such as 10 wt % to 90 wt %, or 40 wt % to 60 wt %, or less than or equal to 90 wt % and greater than or equal to 10 wt %, 15, 20, 25, 30, 35, 40, 42, 44, 46, 48, 50, 52, 54, 56, 58, 60, 65, 70, 75, 80, or 85 wt %. The titanium magneli phase includes one or more magneli-phase titanium suboxides each independently having the formula $Ti_xO_{2x-1}$, wherein x is an integer that is in the range of 2 to 15 (e.g., 2, 3, 4, 5, 6, 7, 8, 9, 10, 11, 12, 13, 14, or 15). The one or more magneli-phase titanium suboxides can include $Ti_2O_3$, $Ti_3O_5$, $Ti_4O_7$, $Ti_5O_9$, $Ti_6O_{11}$, $Ti_7O_{13}$, $Ti_8O_{15}$, $Ti_9O_{17}$, $Ti_{10}O_{19}$, or a combination thereof. The one or more magneli-phase titanium suboxides can include $Ti_6O_{11}$. The one or more magneli-phase titanium suboxides can form any suitable proportion of the titanium magneli phase, such as 30 wt % to 100 wt % of the titanium magneli phase, 50 wt % to 100 wt % of the titanium magneli phase, 90 wt % to 100 wt % of the titanium magneli phase, or greater than or equal to 30 wt %, 35, 40, 45, 50, 55, 60, 65, 70, 75, 80, 82, 84, 86, 88, 90, 91, 92, 93, 94, 95, 96, 97, 98, or 99 wt %.

The composite can have any suitable molar ratio of the titanium magneli phase to the silica phase. For example, the composite can have a molar ratio of the titanium magneli phase to the silica phase of 1:0.1 to 1:10, or 1:1.2 to 1:1.4, or less than or equal to 1:0.1 and greater than or equal to 1:10, 1:9, 1:8, 1:7, 1:6, 1:5, 1:4, 1:3, 1:2, 1:1.9, 1:1.8, 1:1.7, 1:1.6, 1:1.5, 1:1.4, 1:1.3, 1:1.2, 1:1.1, 1:1, 1:0.9, 1:0.8, 1:0.7, 1:0.6, 1:0.5, 1:0.4, or 1:0.2.

The titanium magneli phase can further include $TiO_2$. The $TiO_2$ can form any suitable proportion of the titanium magneli phase, such as 0%, or 0.001 wt % to 70 wt % of the titanium magneli phase, or 0.001 wt % to 50 wt % of the titanium magneli phase, or 0.001 wt % to 10 wt % of the titanium magneli phase, or less than or equal to 70 wt % and greater than or equal to 0.001 wt %, 0.01, 0.1, 1, 2, 3, 4, 5, 6, 7, 8, 9, 10, 15, 20, 25, 30, 35, 40, 45, 50, 55, 60, or 65 wt %.

The silica phase and the titanium magneli phase can be homogenously distributed throughout the composite. The silica phase and the titanium magneli phase can be heterogeneously distributed with respect to each other, such that each phase is compositionally distinct from the other. The silica phase and the titanium magneli phase can each be distinct discontinuous particulate crystalline phases in the composite. Each particle (e.g., crystallite, or agglomeration of crystallites) of the silica phase can contact one or more other particles of the silica phase and/or one or more particles of the titanium magneli phase, and likewise each particle of the titanium magneli phase can contact one or more particles of the silica phase and/or one or more other particles of the titanium magneli phase. The mean particle size of the silica phase, such as determined from X-ray diffraction spectroscopy via the Scherrer equation, can be 10 nm to 60 nm, 30 nm to 40 nm, or less than or equal to 60 nm and greater than or equal to 10 nm, 15, 20, 25, 30, 31, 32, 33, 34, 35, 36, 37, 38, 39, 40, 45, 50, or 55 nm. The mean particle size of the titanium magneli phase, such as determined from X-ray diffraction spectroscopy via the Scherrer equation, can be 1 nm to 30 nm, 5 nm to 10 nm, or less than or equal to 30 nm and greater than or equal to 1 nm, 2, 4, 5, 6, 7, 8, 9, 10, 11, 12, 13, 14, 15, 16, 18, 20, or 25 nm.

The composite can be in the form of particles. The particles can have a particle size (e.g., a $D_{50}$ number average particle size) of 10 nm to 150 nm, or 30 nm to 70 nm, or less than or equal to 150 nm and greater than or equal to 10 nm, 15, 20, 25, 30, 35, 40, 45, 50, 55, 60, 65, 70, 75, 80, 85, 90, 95, 100, 105, 110, 115, 120, 125, 130, 135, 140, or 145 nm.

The composite can have any suitable electrochemical surface area, such as an electrochemical surface area of 1 $m^2/g$ to 4 $m^2/g$, or 2 $m^2/g$ to 3.2 $m^2/g$, or 2.4 $m^2/g$ to 2.8 $m^2/g$, or less than or equal to 4 $m^2/g$ and greater than or equal to 1 $m^2/g$, 1.2, 1.4, 1.6, 1.8, 2, 2.1, 2.2, 2.3, 2.4, 2.5, 2.6, 2.7, 2.8, 2.9, 3, 3.1, 3.2, 3.3, 3.4, 3.5, 3.6, 3.7, or 3.8 $m^2/g$.

When subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the composite can have a degradation in current of 0% to 10%, or no degradation in current, or a degradation in current of less than or equal to 10%, 9, 8, 7, 6, 5, 4, 3, 2, 1, 0.5, or 0.1%.

When subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the composite can have a degradation in electrochemical surface area of 0% to 20%, or 5% to 10%, or 0%, or less than or equal to 20% and greater than or equal to 0.1%, 0.5, 1, 2, 3, 4, 5, 6, 7, 8, 9, 10, 12, 14, 16, or 18%.

As described herein, the composite can be for use as a catalyst support in an electrode, such as in an electrode including catalyst particles (e.g., platinum particles) that are supported by the composite.

Electrode

The present invention provides an electrode that includes supported catalyst particles. The supported catalyst particles include the composite of the present invention including a silica phase and a titanium magneli phase. The supported platinum particles also include catalyst particles that are homogeneously distributed in the composite.

The catalyst particles can be any suitable material for an electrode catalyst. In some aspects, the catalyst particles are a high cost material that benefits from cost efficiencies gained by supporting the catalyst particles on a high surface area material. For example, the catalyst particles can include Pd, Ni, Au, Co, Pt, Ru, Ir, Nb, or a combination thereof. The catalyst particles can include Pt.

The electrode can further include one or more ionomeric polymers. The ionomeric polymers can be polymers that include repeat units that include ionized and/or ionizable pendant groups covalently bonded to the backbone, such as carboxylic acid or sulfonic acid groups. For example, the ionomeric polymers can include ethylene-methacrylic acid, polystyrene sulfonate, a sulfonated tetrafluoroethylene based fluoropolymer-copolymer such as Nafion. The one or more ionic polymers can be homogeneously distributed with the composite in the electrode. The one or more ionic polymers can be any suitable proportion of the electrode. For example, the one or more ionic polymers can be 1% to 50 wt % of the electrode, or 1% to 10 wt % of the electrode, or less than or equal to 50 wt %, 45, 40, 35, 30, 25, 20, 15, 14, 13, 12, 11, 10, 9, 8, 7, 6, 5, 4, 3, 2, or 1 wt %. The supported catalyst particles can be any suitable proportion of the electrode. For example, the supported catalyst particles can be 50 wt % to 100 wt % of the electrode, or 90 wt % to 100 wt % of the electrode, or greater than or equal to 50 wt %, 55, 60, 65, 70, 75, 80, 85, 86, 87, 88, 89, 90, 91, 92, 93, 94, 95, 96, 97, 98, 99, 99.5, or 99.9 wt % of the electrode.

The electrode can further include one or more optional additives in addition to the supported catalyst particles and the one or more ionomeric polymers. For example, the electrode can include a binder additive.

The catalyst particles can have any suitable size, such that an electrochemical cell including the electrode including the supported platinum catalyst functions as desired. For example, the catalyst particles can have a particle size (e.g., a $D_{50}$ number average particle size) of 1 nm to 1,000 nm, or 5 nm to 200 nm, or less than or equal to 1,000 nm and greater than or equal to 1 nm, 5, 10, 20, 30, 40, 50, 60, 70, 80, 90, 100, 110, 120, 130, 140, 150, 160, 170, 180, 190, 200, 225, 250, 275, 300, 350, 400, 450, 500, 600, 700, 800, 900, or 950 nm.

The composite including the silica phase and the titanium magneli phase can be any suitable proportion of the supported catalyst particles. The composite can be 40 wt % to 95 wt % of the supported catalyst particles, or 60 wt % to 80 wt % of the supported catalyst particles, or less than or equal to 95 wt % and greater than or equal to 40 wt %, 45, 50, 55, 60, 62, 64, 66, 68, 70, 72, 74, 76, 78, 80, 85, 90, or 94 wt %. The catalyst particles can be any suitable proportion of the supported catalyst particles, such as 5 wt % to 60 wt % of the supported catalyst particles, or 20 wt % to 40 wt % of the supported catalyst particles, or less than or equal to 60 wt % and greater than or equal to 5 wt %, 10, 15, 20, 22, 24, 26, 28, 30, 32, 34, 36, 38, 40, 45, 50, or 55 wt %.

The electrode can have any suitable electrochemical surface area, such as 1 $m^2/g$ to 4 $m^2/g$, 2.7 $m^2/g$ to 3.5 $m^2/g$, 2.9 $m^2/g$ to 3.3 $m^2/g$, or less than or equal to 4 $m^2/g$ and greater than or equal to 1 $m^2/g$, 1.2, 1.4, 1.6, 1.8, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, or 3.9 $m^2/g$.

When subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode can have a degradation in current of 0% to 10%, or 0%, or greater than or equal to 0% and less than or equal to 10%, 9, 8, 7, 6, 5, 4, 3, 2, or 1%.

When subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode can have a degradation in electrochemical surface area of 0% to 20%, 5% to 10%, 0%, or less than or equal to 20% and greater than or equal to 0%, 1, 2, 3, 4, 5, 6, 7, 8, 9, 10, 11, 12, 13, 14, 15, 16, 17, 18, or 19%.

When subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode can have a degradation of onset potential of oxygen reduction reaction of 0% to 20%, 1% to 15%, 0%, or less than or equal to 20% and greater than or equal to 0%, 1, 2, 3, 4, 5, 6, 7, 8, 9, 10, 11, 12, 13, 14, 15, 16, 17, 18, or 19%.

Electrochemical Cell

The present invention provides an electrochemical cell. The electrochemical cell can be any suitable electrochemical cell that includes the composite including the silica phase and the magneli phase, and/or that includes the supported catalyst particles described herein. For example, the electrochemical cell can include an anode, a cathode, and a proton-exchange membrane between the anode and cathode. A proton-exchange membrane is a semipermeable membrane that conducts protons while acting as an electronic insulator and reactant barrier, and when used in an electrochemical cell the membrane includes an anode layer on one side of the membrane and a cathode layer on the other side.

The proton-exchange membrane separates reactants and transport of protons while blocking a direct electronic pathway through the membrane. The anode, the cathode, or both the anode and the cathode, can include the electrode described herein that includes supported catalyst particles that include catalyst particles and the composite including the silica phase and the titanium magneli phase. The electrochemical cell can be a fuel cell, an ammonia-forming cell, or a water-electrolysis cell. The electrochemical cell can be a fuel cell.

Method of Making the Composite

The present invention provides a method of making the composite including the silica phase and the titanium magneli phase. The method can be any suitable method that generates the composite. For example, the method can include combining $SiO_2$ and $TiO_2$ to form a mixture. The method can include reducing the mixture to form the composite.

The combining can be any suitable combining. For example, the combining can include combining the $SiO_2$ and the $TiO_2$ in a solvent with mixing. The solvent can be water and/or an organic solvent, such as an alcohol. The alcohol can be ethanol.

The reducing can be any suitable reducing that forms the titanium magneli phase. The reducing can include reducing the mixture with heating under an atmosphere that includes $H_2$ (e.g., any suitable % $H_2$, such as 1% to 50% $H_2$, or 1% to 10%, or 5% $H_2$). The heating can include heating at 900° C. to 1300° C., or 1000° C. to 1100° C.

Method of Making the Electrode

The present invention provides a method of making the electrode that includes the supported catalyst particles that include the composite. The method can be any suitable method that forms the electrode. For example, the method can include combining catalyst particles and the composite including the silica phase and the titanium magneli phase to form the supported catalyst particles. The method can further include combining the supported catalyst particles with one or more ionomeric polymers, and one or more other optional ingredients (e.g., binder additive) to form the electrode.

The combining of the catalyst particles and the composite can be any suitable combining. The combining can include combining the catalyst particles and the composite in a dry state. The combining can include mechanical mixing, such as ball milling or mixing via a mortar and pestle.

Method of Using the Electrochemical Cell

The present invention provides a method of using the electrochemical cell including an electrode that includes the supported catalyst particles that include the composite. The method can be any suitable method of using the electrochemical cell to generate electricity (e.g., when the electrochemical cell is a fuel cell), or of applying electricity to the cell to cause the cell to carry out a chemical reaction (e.g., when the electrochemical cell is an ammonia-forming cell or a water-electrolysis cell). For example, the method of using the electrochemical cell can include generating or applying a voltage across the anode and cathode of the electrochemical cell. For embodiments of the electrochemical cell that are a fuel cell, the method of using the electrochemical cell can include generating a voltage across the anode and cathode of the fuel cell, such as by providing reactants to the anode and/or cathode of the electrochemical cell.

Examples

Various embodiments of the present invention can be better understood by reference to the following Examples which are offered by way of illustration. The present invention is not limited to the Examples given herein.

The robustness of the cathode catalysts used in polymer exchange membrane fuel cells (PEMFCs) is one of the major factors that determine their durability. In this work, a new class of corrosion-resistant catalyst, Pt-MTO composite was prepared, and the durability of a Pt-MTO cathode under conditions of was evaluated and compared with the state-of-the-art Pt/C catalyst. Like Pt/C, Pt-MTO exhibited exclusively 4e⁻ oxygen reduction reaction (ORR) in acidic solution. The accelerated degradation studies were performed using Pt-MTO and Pt/C catalysts in $O_2$-saturated 0.5 M $H_2SO_4$ solution. To investigate the accelerated stability of catalysts (Pt-MTO and Pt/C), the potential steps cycles experiments were carried out from 0.95 V to 0.6 V for 12000 cycles. The results indicated that the electrochemical surface area (ECSA) of the Pt-MTO is much more stable than that of a state-of-the-art Pt/C, and there is only 7% loss of the ECSA even after 12,000 potential cycles which clearly revealed the excellent stability of Pt nanoparticles supported on MTO.

In this study, a metal oxide (MO)—$TiO_x$ (MTO) composite was fabricated and then used as the catalyst support of Pt. The oxygen reduction reaction (ORR) activity of this catalyst was performed using $O_2$-saturated 0.5 M $H_2SO_4$ solution and the stability was evaluated using accelerated degradation techniques at two different potential for 12000 cycles. MTO support Pt showed the excellent activity and stability towards ORR. The ORR activity and stability of synthesized catalyst was compared with the state-of-the-art Pt/C ORR catalyst.

Materials. The analytical grade purity materials were used in this study and were used without further purification.

Synthesis of metal titanium oxide (MTO). MTO as a support material for fuel cell catalyst was synthesized as follows: 0.45 g of metal oxide (MO) (silica, $SiO_2$) was dispersed in 20 ml of ethanol; the solution was stirred for 10 mins. Then, 0.45 g of anatase $TiO_2$ was slowly added to the above solution and stirred it for 80 mins. Afterwards, the solvent was evaporated at 70° C. with continuous stirring. Finally, the material was reduced at 1050° C. in the mixture of 5% $H_2$ and 95% $N_2$ for 5 h. The obtained solid was noted as MTO. The MTO had a molar ratio of the titanium magneli phase to the silica phase of 1:1.33.

Synthesis of Pt-MTO. The Pt-MTO catalyst was prepared as follows: (1) 105.9 mg of MTO and 45.4 mg of Pt nanoparticle was mechanically mixed with pestle and mortar. Then, transferred it into a ceramic boat and treated in inert atmosphere at 400° C. for 3 h. Thus, the obtained solid was noted as Pt-MTO catalyst.

Electrode Preparation. The catalyst ink was prepared by ultrasonically dispersing 10.0 mg catalysts in 1.0 mL mixture isopropyl alcohol (IPA), water and 5% Nafion solution (686, 294 and 20 respectively) and the dispersion was then ultrasonicated for 30 min. Glassy carbon (GC) rotating disk electrodes, RDEs, with 5 mm diameter were polished with 0.05 μm alumina suspensions to a mirror finish before each experiment and served as an underlying conductive substrate of the working electrode. A quantity of 10 μL of the dispersion was pipetted out on the top of the GC. The catalyst layer was dried at room temperature. The Nafion-coated working electrode was dried at room temperature and finally heated at 130° C. for 30 mins in air in an oven.

Surface Characterizations. Powder X-ray powder diffraction (XRD) was performed on an X-ray diffractometer (Smartlab, Rigaku) operated at 40 kV and 44 mA using Cu Kα radiation at a scan rate of 4° C./min from 10° C.-80° C. The particle morphology and element composition were analyzed by field-mission scanning electron microscopy (FEI Quanta 650 FEG SEM) equipped with an energy dispersive X-ray (EDX) spectrometer. In addition, MTO and Pt-MTO were observed by transmission electron microscopy (Hitachi 7500 TEM).

Electrochemical Measurements. The electrochemical characterizations were performed with the electrocatalyst immersed in 0.5M $H_2SO_4$ solution where prior to each measurement the electrolyte solution was purged with either $N_2$ or $O_2$ gas for 15 min. In the ORR study, the RDE voltammetric measurements were carried out using PINE Rotating Electrode speed controller in $O_2$-saturated solution and recorded at various rotation rates. All current densities were normalized by the geometric surface area of electrode.

Figure 2A:
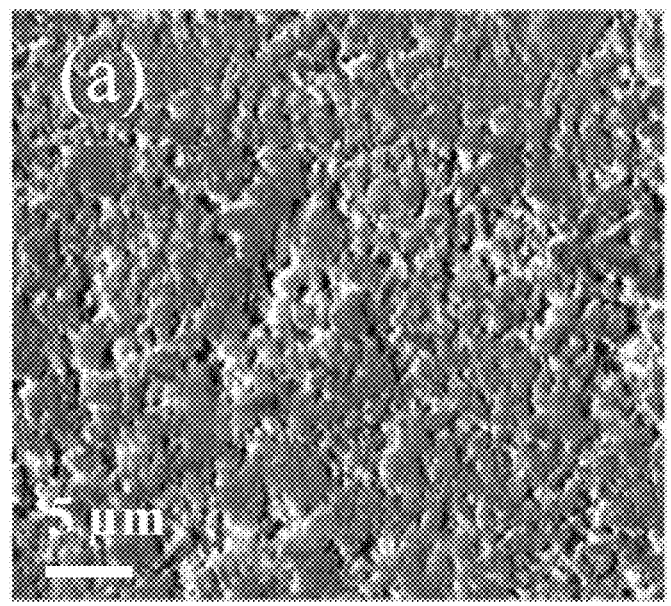
FIG. 2A illustrates a SEM image of MTO, in accordance with various embodiments.
Figure 2B:
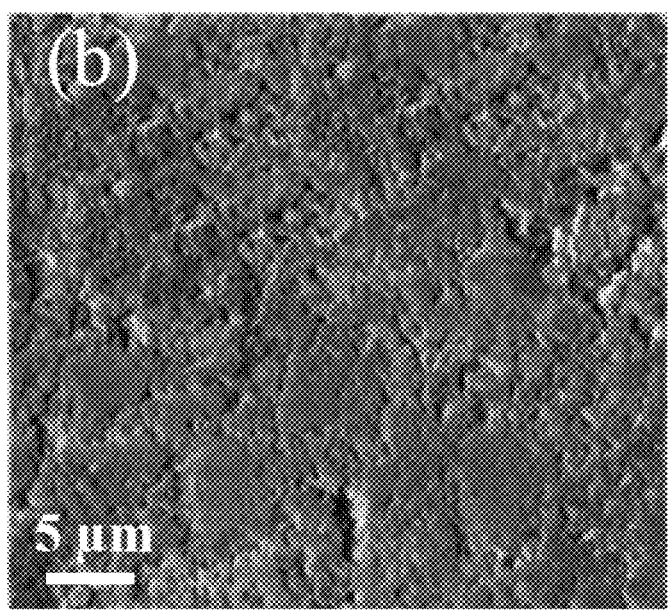
FIG. 2B illustrates a SEM image of Pt/MTO, in accordance with various embodiments.
Figure 2C:
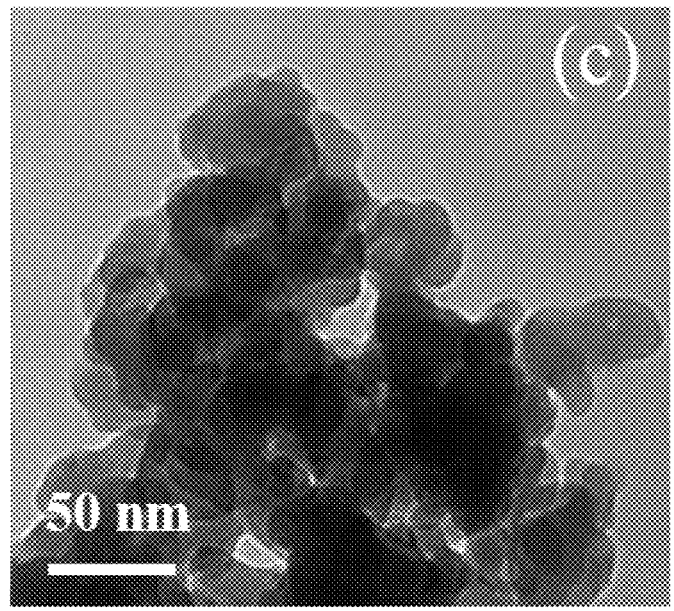
FIG. 2C illustrates a TEM image of MTO, in accordance with various embodiments.
Figure 2D:
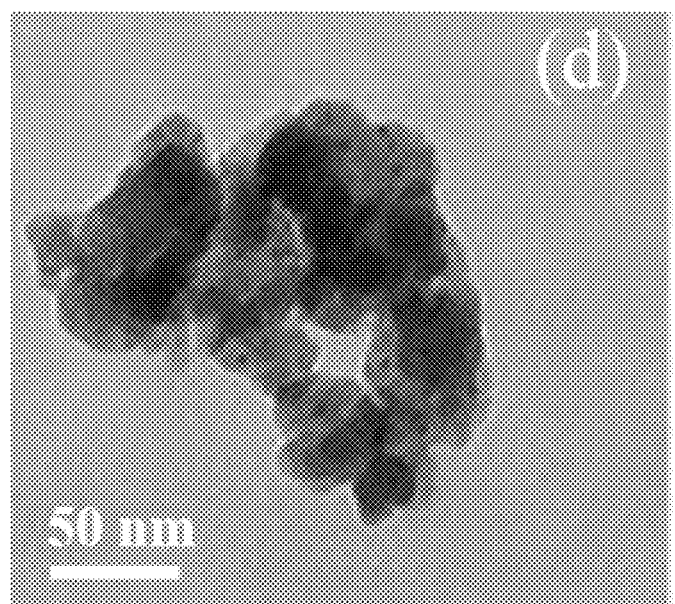
FIG. 2D illustrates a TEM image of Pt/MTO, in accordance with various embodiments.
Figure 2E:
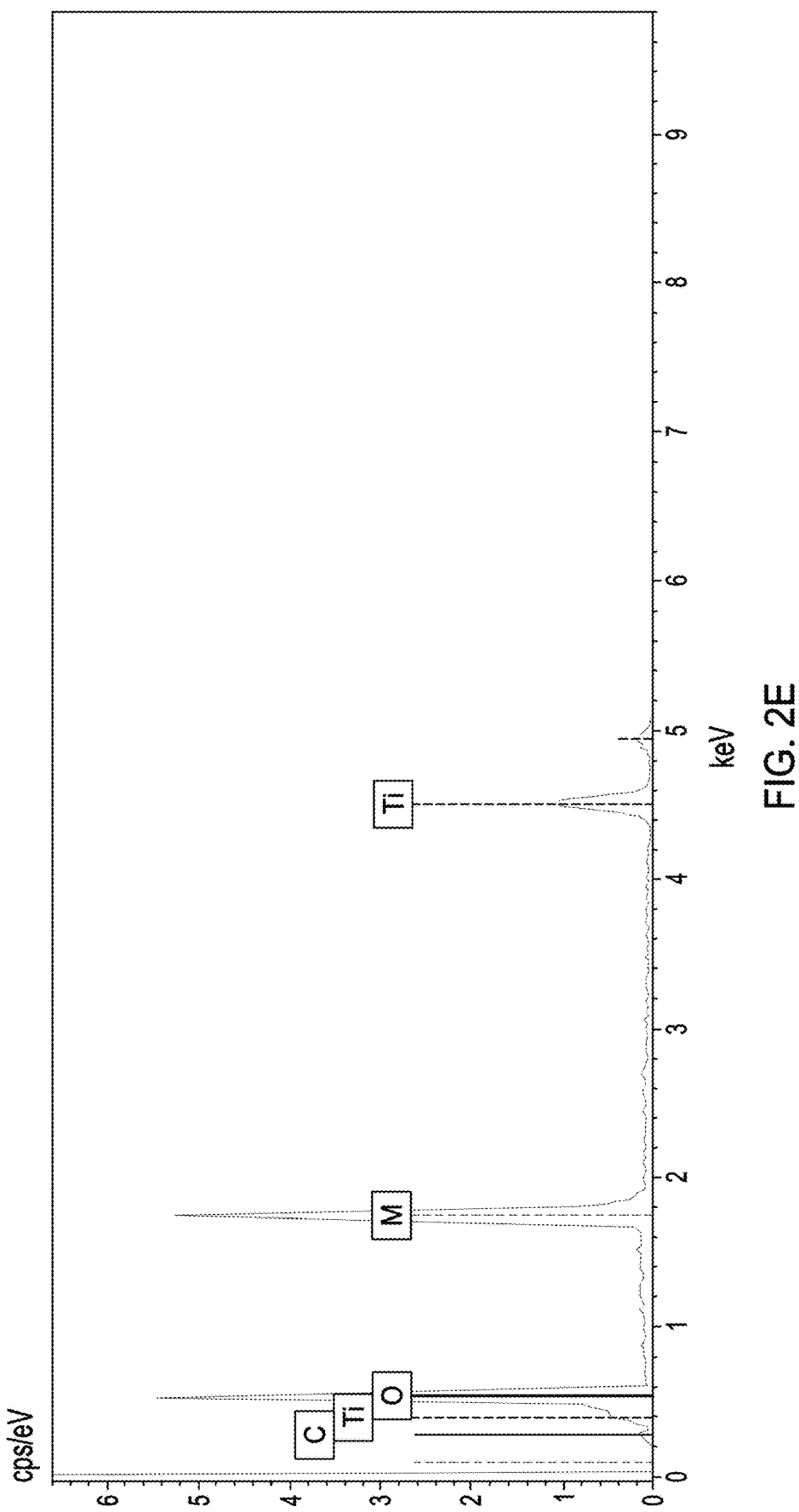
FIG. 2E illustrates an EDS spectra of MTO, in accordance with various embodiments.
Figure 2F:
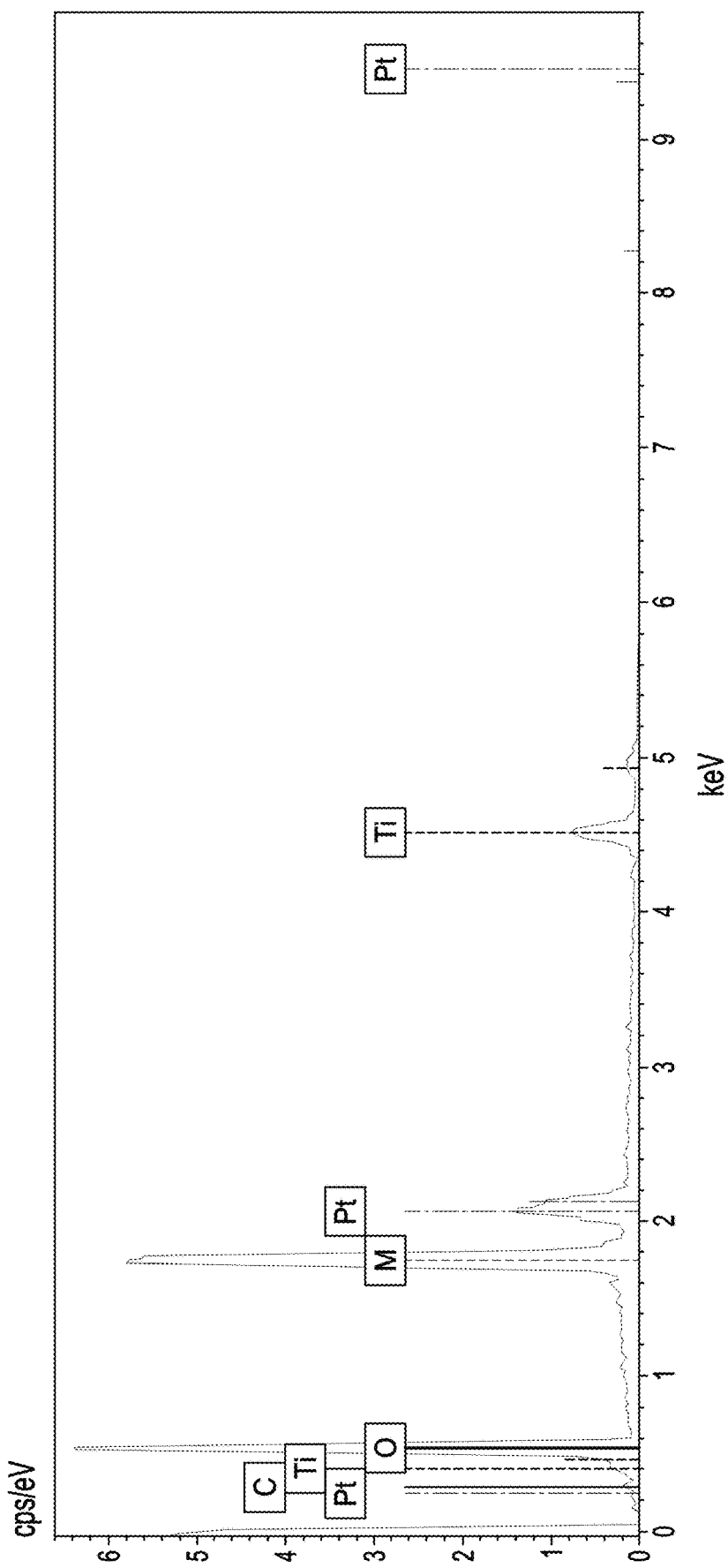
FIG. 2F illustrates an EDS spectrum of Pt/MTO, in accordance with various embodiments.

Results and Discussion. FIG. 1 illustrates the XRD patterns of the MTO and Pt-MTO. The magneli titania phase found in the MTO and Pt-MTO was mainly $Ti_6O_{11}$ along with some rutile $TiO_2$. The metal oxide (MO) phase was also identified in both XRD spectra. In the MTO, the Scherrer equation was used to determine the mean particle size of the titanium magneli and silica crystallites, which were 9.53 nm and 34.23 nm, respectively. The Pt XRD peaks were observed Pt-MTO spectra which confirm the successful synthesis of Pt on MTO. FIGS. 2A and 2B show the SEM images of MTO and Pt-MTO, respectively. As seen from FIGS. 2A-B, there is no marked difference in the distribution and morphology the phases in Pt-MTO compare to MTO. The TEM micrographs of MTO and Pt-MTO are shown the FIGS. 2C and 2D, respectively. The particles were well-distributed in the samples. The EDX pattern of the MTO and Pt-MTO electrocatalyst (FIG. 2E and 2F, respectively) clearly shows an elemental characteristic of the surface, that is, the presence of Ti, M, O, C in MTO and Pt, Ti, M, O, C in Pt-MTO. More information on the element distribution along the whole samples was investigated with the EDS mapping technique. FIGS. 3A-B show the EDS mappings of MTO (3A) and Pt-MTO (3B) samples. A very uniform distribution of Ti, M and O elements in the MTO was observed. In the Pt-MTO sample, Pt appeared to be homogeneously distributed across the whole MTO particle.

Figure 4:
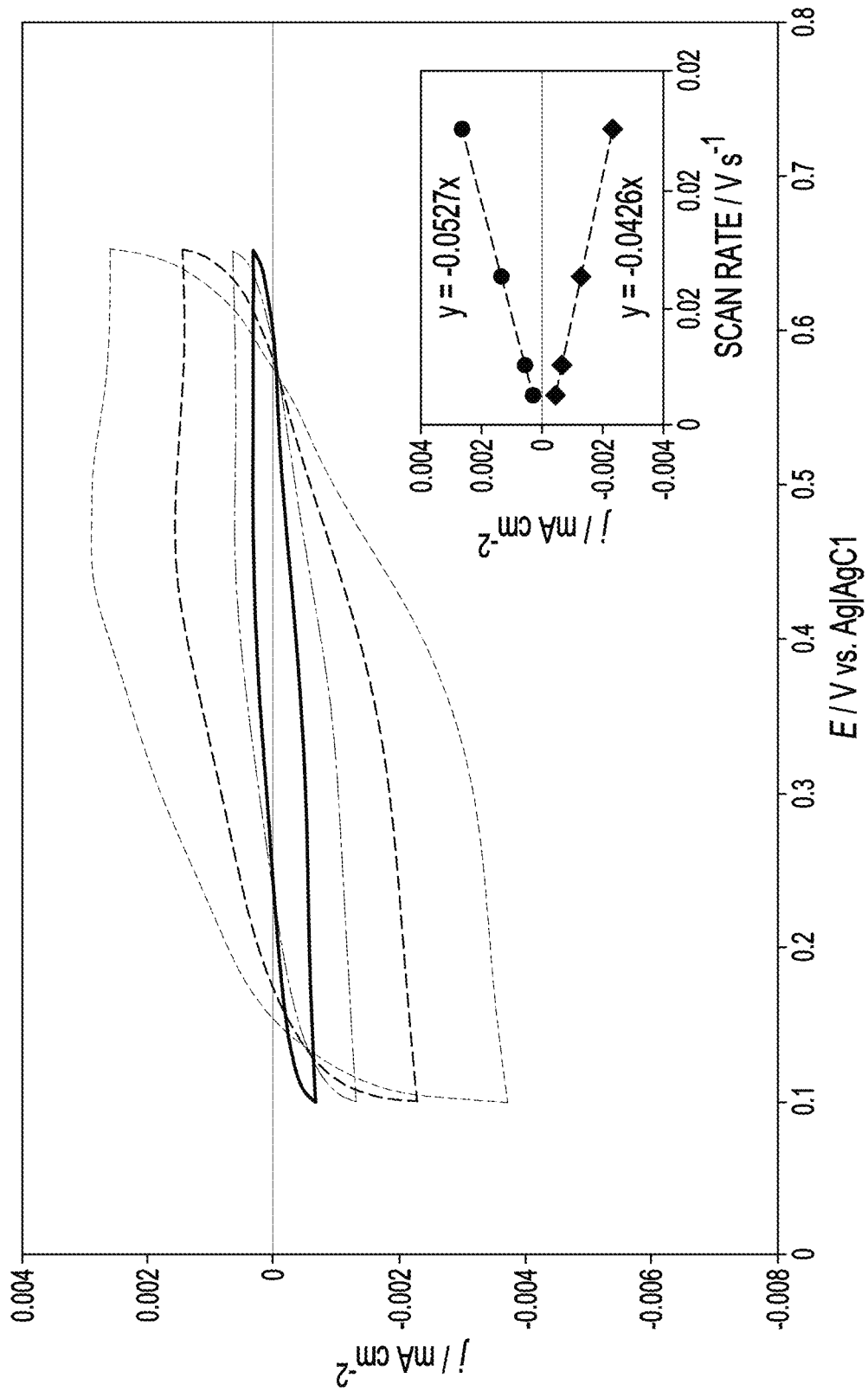
FIG. 4 illustrates a cyclic voltammogram of $SiO_2$—$TiO_x$ in $N_2$-saturated 0.5 M $H_2SO_4$, with the inset showing the variation of anodic and cathodic current obtained at 0.4 V using various scan rates, in accordance with various embodiments.

Electrochemical surface-active area (ECSA). FIG. 4 shows a cyclic voltammogram (CV) obtained at MTO in $N_2$-saturated 0.5 M $H_2SO_4$ electrolyte solution. The scan rates were varied from 5 to 50 mV s$^{-1}$, and the variation of anodic and cathodic current obtained at 0.4 V at different scan rate is shown in the inset. A double layer charging current can be observed at MTO support materials at different scan rate. The measured charging current ($i_c$) is equal to the product of the scan rate (v) and the $C_{dl}$, as given by equation (1).

$$i_c = v \cdot C_{dl} \quad (1)$$

Therefore, the slope derived from a plot of $i_c$ as a function of v equal to the $C_{dl}$ (Inset of FIG. 4). The ECSA of a catalyst is calculated by dividing the $C_{dl}$ with specific capacitance of the sample according to equation (2).

$$ECSA = C_{dl}/C_s \quad (2)$$

A commonly used $C_s$ value (0.040 mF cm$^{-2}$) for metal surfaces is used in this study and the ECSA is calculated as 2.64 m$^2$/g.

Figure 5A:
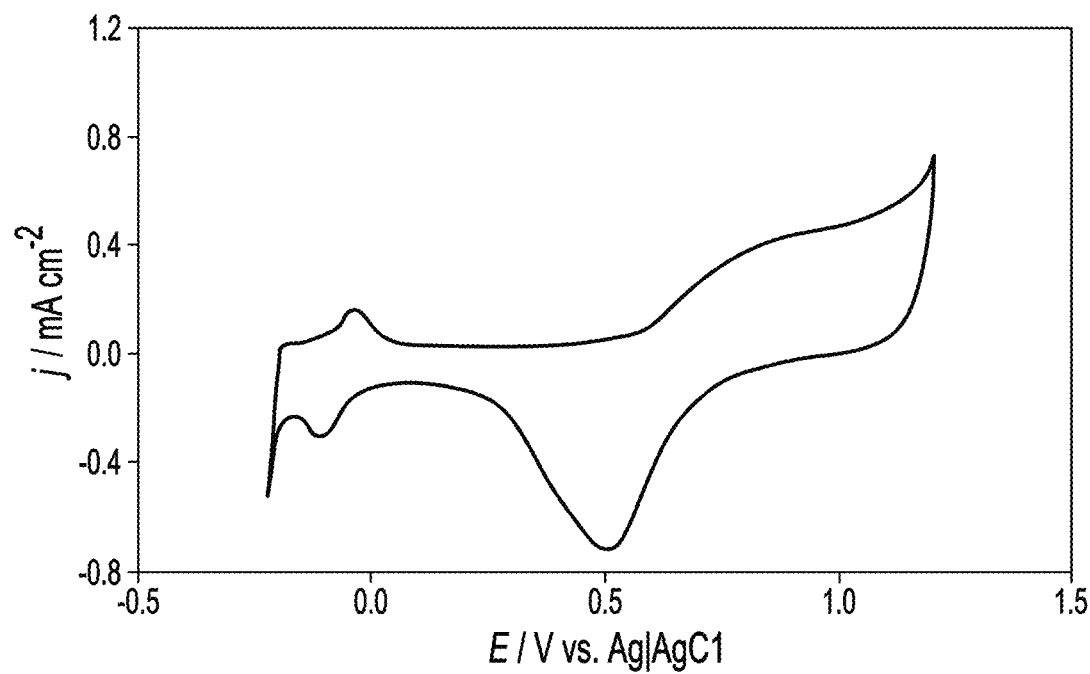
FIG. 5A illustrates a cyclic voltammogram of Pt/C in $N_2$-saturated 0.5 M $H_2SO_4$ at a scan rate of 25 mV $s^{-1}$, in accordance with various embodiments.
Figure 5B:
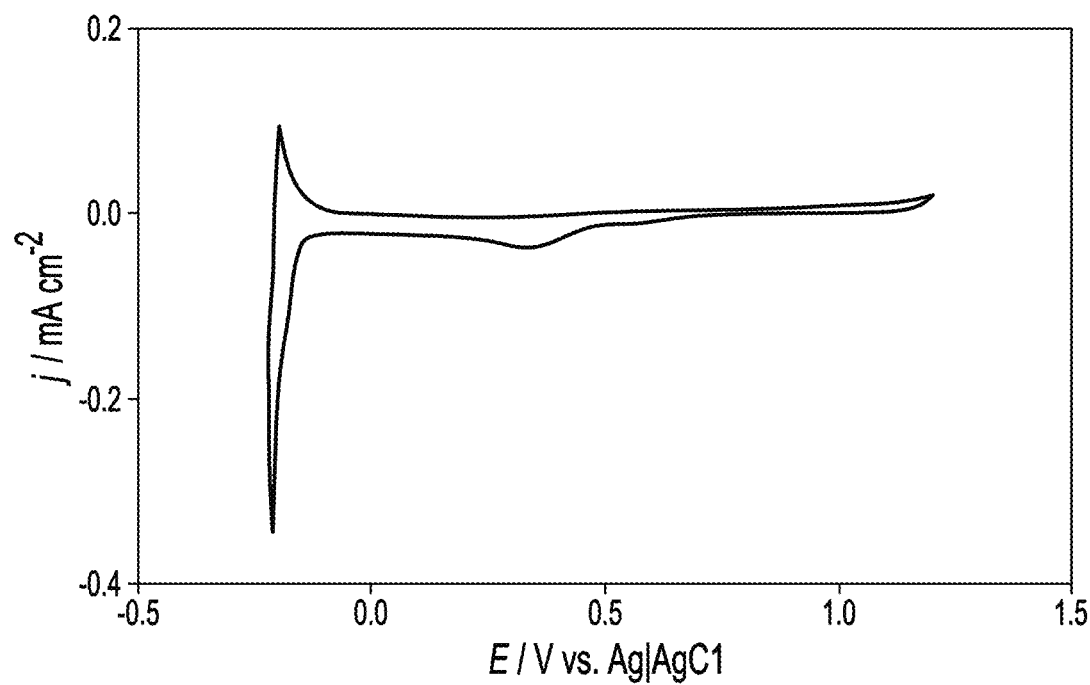
FIG. 5B illustrates a cyclic voltammogram of Pt/MTO in $N_2$-saturated 0.5 M $H_2SO_4$ at a scan rate of 25 mV $s^{-1}$, in accordance with various embodiments.

A characteristic CV response expected for Pt electrode is obtained for both the Pt-MTO and Pt/C electrocatalysts (FIGS. 5A-B) corresponding to the hydrogen adsorption-desorption and the oxide layer formation and its reduction. The ECSAs of Pt-MTO and Pt/C are calculated as 3.13 m$^2$/g and 1.01 m$^2$/g, respectively. It is noted that the ECSA of Pt-MTO was found to be three times higher than Pt/C.

Figure 6A:
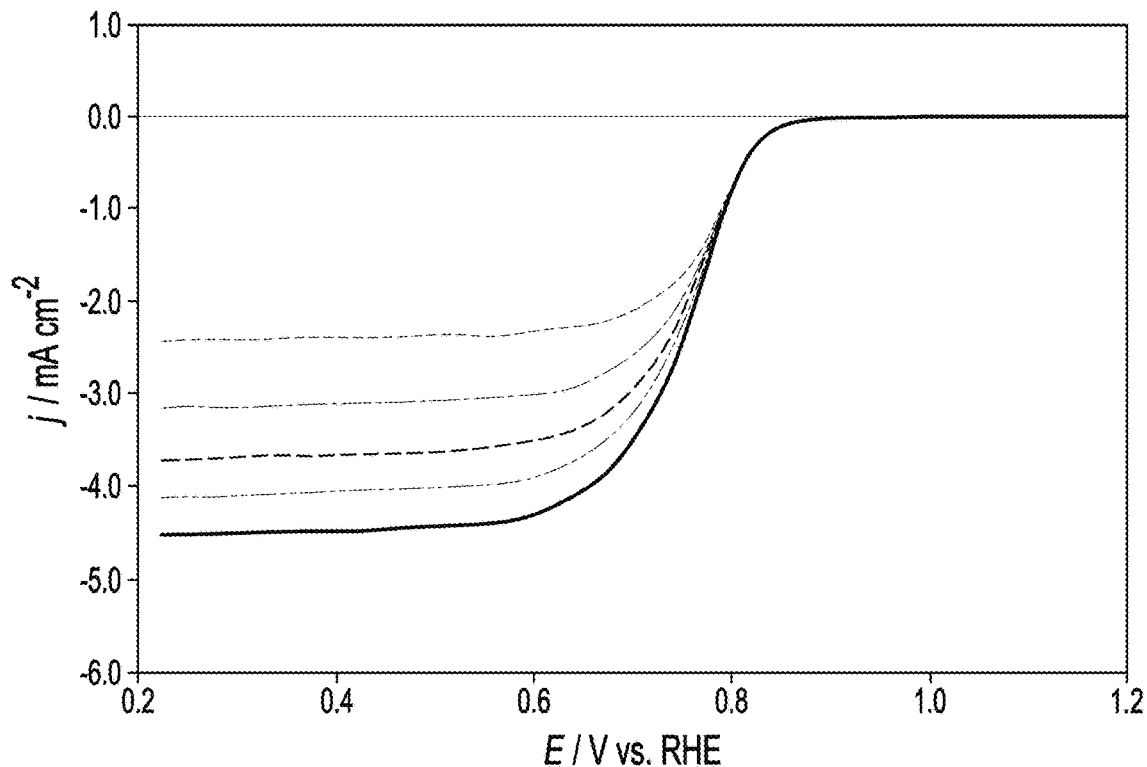
FIG. 6A illustrates a hydrodynamic voltammogram obtained at disk electrodes coated with Pt/C electrocatalyst $O_2$-saturated 0.5 M $H_2SO_4$ solution at scan rate of 10 mV $s^{-1}$ at various rotation rates of 400 to 2000 rpm, in accordance with various embodiments.
Figure 6B:
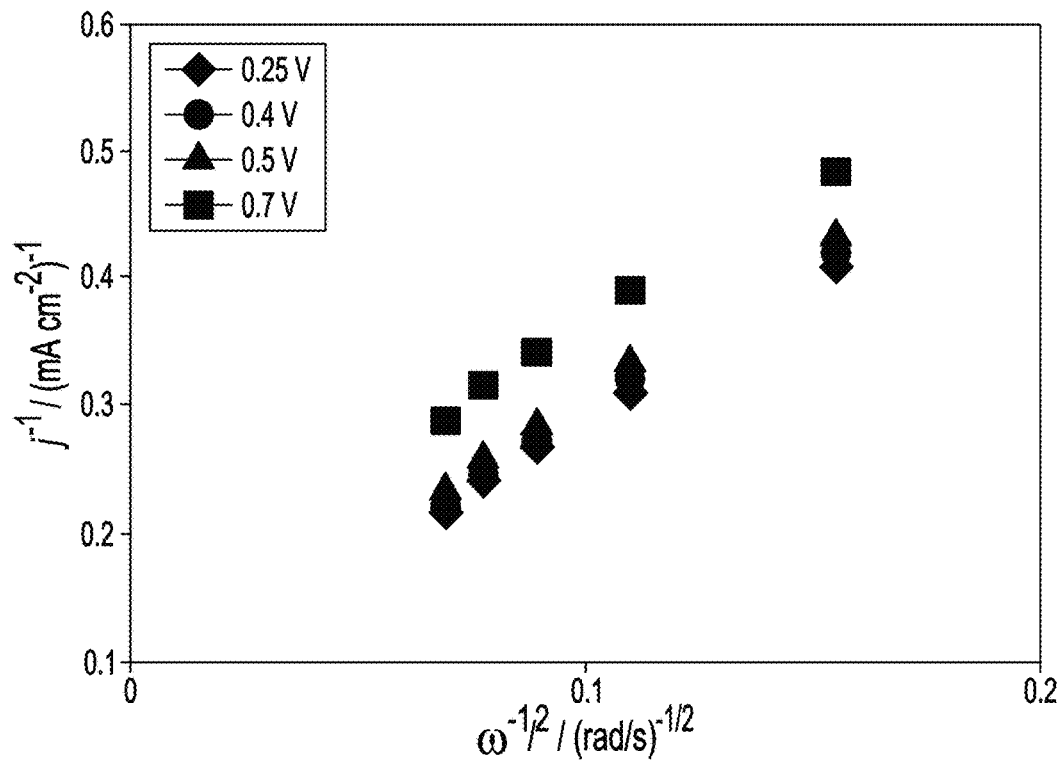
FIG. 6B illustrates a hydrodynamic voltammogram obtained at disk electrodes coated with Pt/MTO electrocatalyst $O_2$-saturated 0.5 M $H_2SO_4$ solution at scan rate of 10 mV $s^{-1}$ at various rotation rates of 400 to 2000 rpm, in accordance with various embodiments.
Figure 6C:
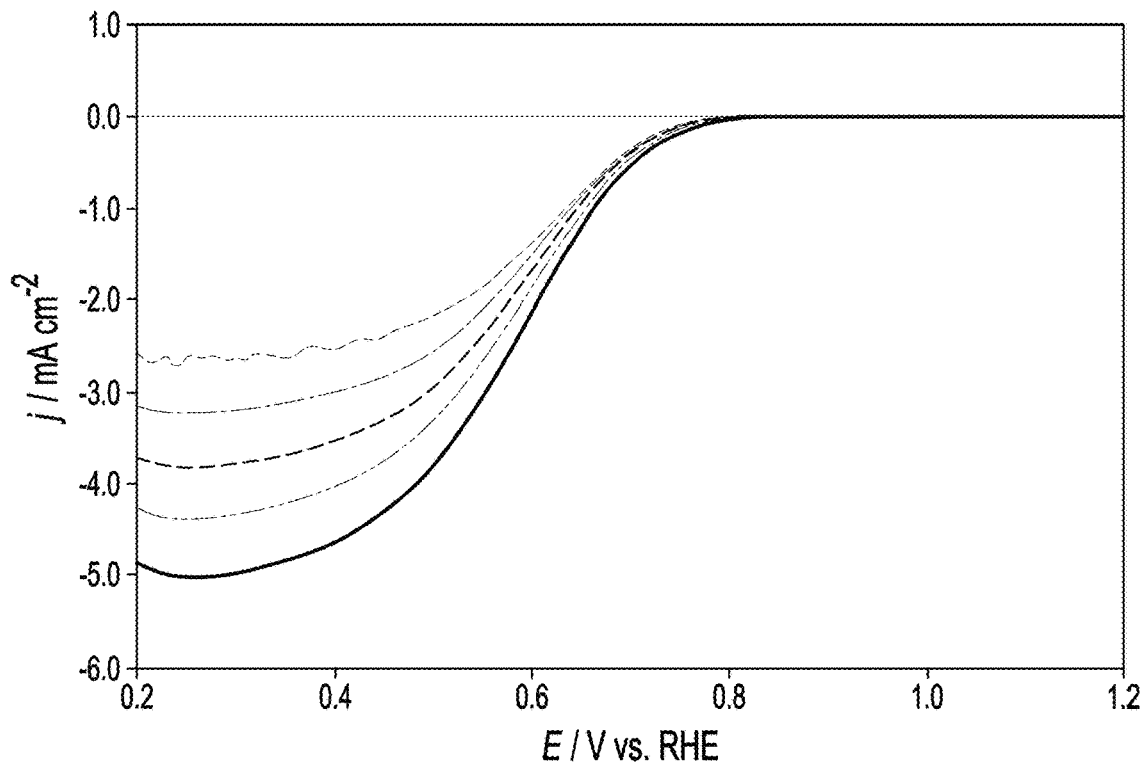
FIG. 6C illustrates a Koutecky-Levich plot of Pt/C electrocatalyst at various potentials, in accordance with various embodiments.
Figure 6D:
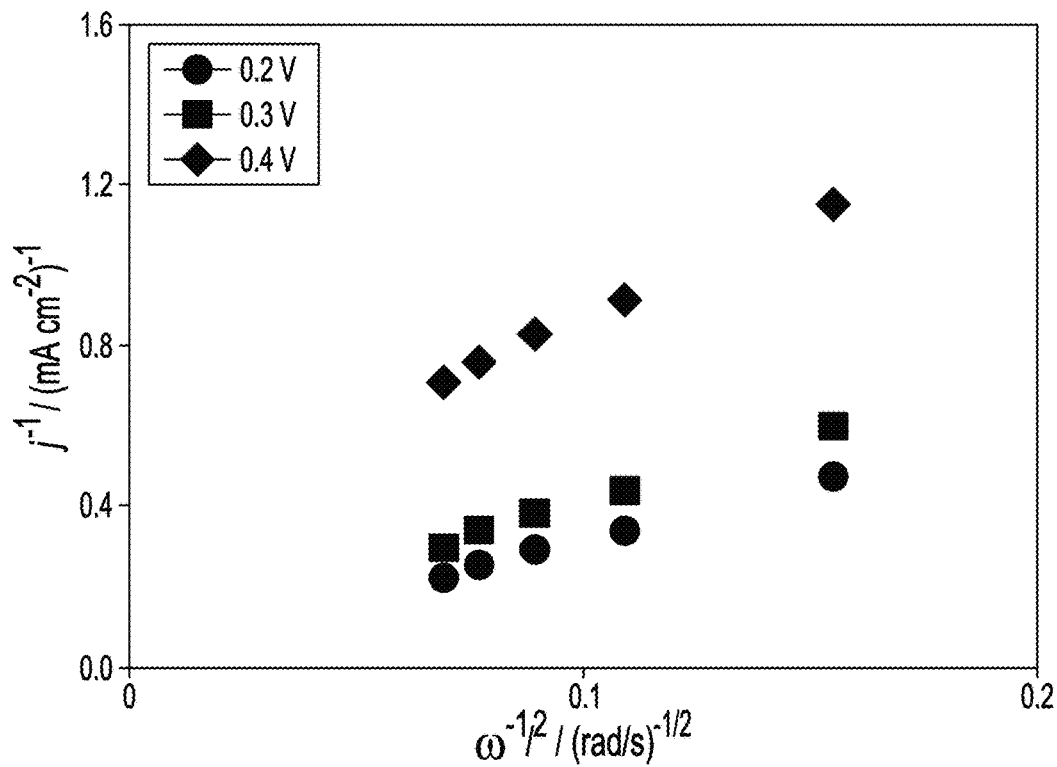
FIG. 6D illustrates a Koutecky-Levich plot of MTO electrocatalyst at various potentials, in accordance with various embodiments.

An RDE voltammetric technique is extremely useful in evaluating the catalytic activity of electrocatalyst for ORR. FIGS. 6A-B illustrate hydrodynamic voltammograms obtained for the ORR at the state-of-the-art Pt/C or Pt-MTO-modified electrodes at different rotation rates speed of 400-2000 rpm in $O_2$-saturated 0.5 M $H_2SO_4$ electrolyte solution at a scan rate of 10 mV s$^{-1}$. The transferred electron number per oxygen molecule involved in the ORR at the Pt/C and Pt-MTO electrocatalysts was determined by the Kouteckey-Levich equation (equation 3) in which $i_L$ is the Levich current and is expressed by equation 4.

$$\frac{1}{i_l} = \frac{1}{i_k} + \frac{1}{i_L} \quad (3)$$

$$i_L = 0.62 n F A D_{O_2}^{2/3} v^{-1/6} C_{O_2} \omega^{1/2} \quad (4)$$

where n is number of electrons transferred for per oxygen molecule, F is the Faraday constant (96 485 C mol$^{-1}$), A is geometric area of electrode (0.196 cm$^2$), $D_{O_2}$ is the diffusion coefficient of $O_2$ (1.93 10$^{-5}$ cm$^2$ s$^{-1}$), v is the kinetic viscosity of the solution (1.009 10$^{-2}$ cm$^2$ s$^{-1}$), and $C_{O_2}$ is the concentration of dissolved $O_2$ in solution (1.26 10$^{-3}$ mol L$^{-1}$). As shown in FIGS. 6C-D, the Kouteckey-Levich plots of $i_l^{-1}$ versus $\omega^{1/2}$ at various potentials for the voltammograms of FIGS. 6A-B gave the straight lines the slopes of that are actually equal to that expected for four-electron ORR, and the values of n were found to be 3.98 and 3.94 for the Pt/C, and Pt-MTO electrocatalysts, respectively.

Figure 7:
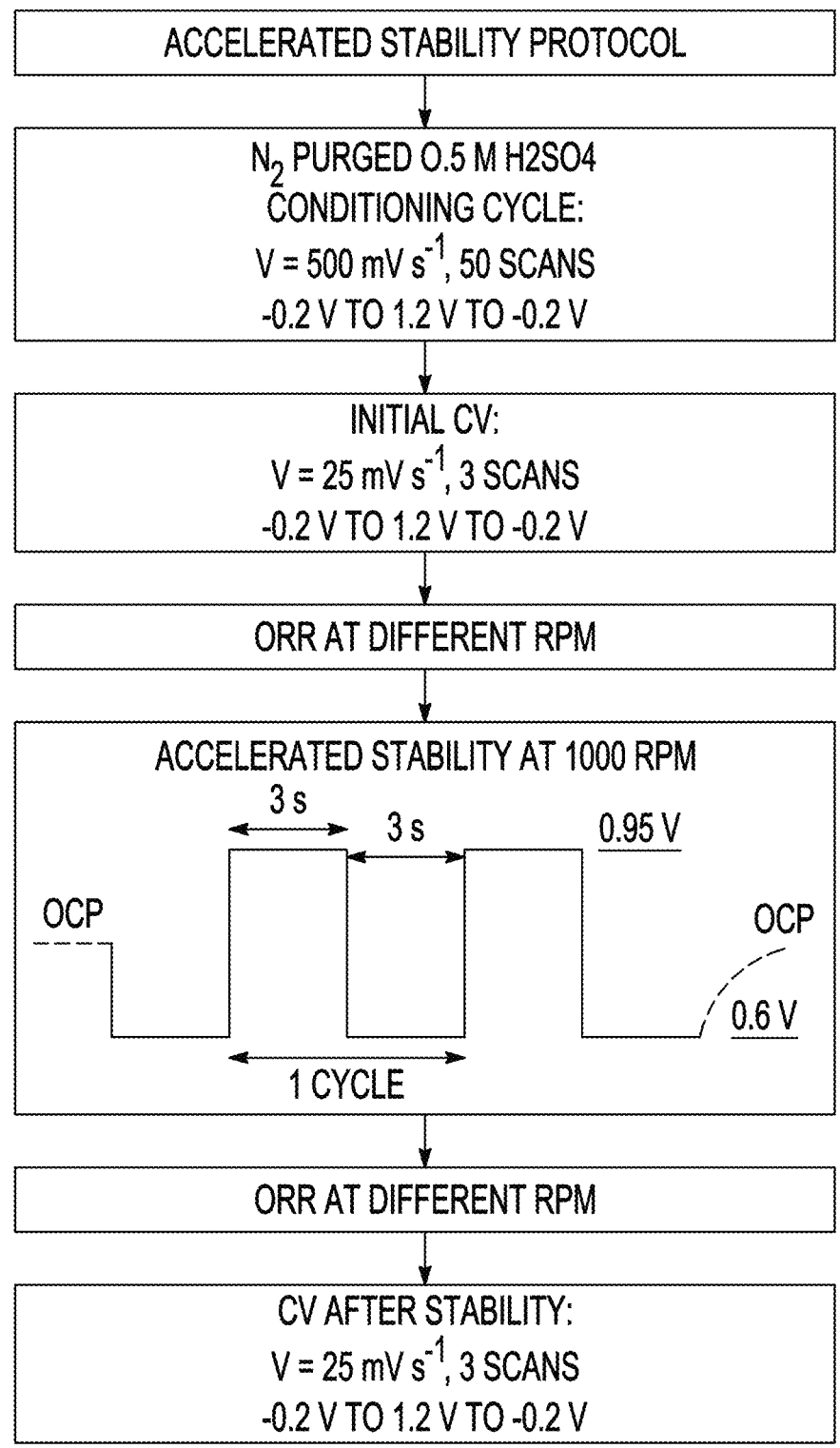
FIG. 7 illustrates an accelerated degradation protocol of fuel cell catalyst, in accordance with various embodiments.
Figure 8A:
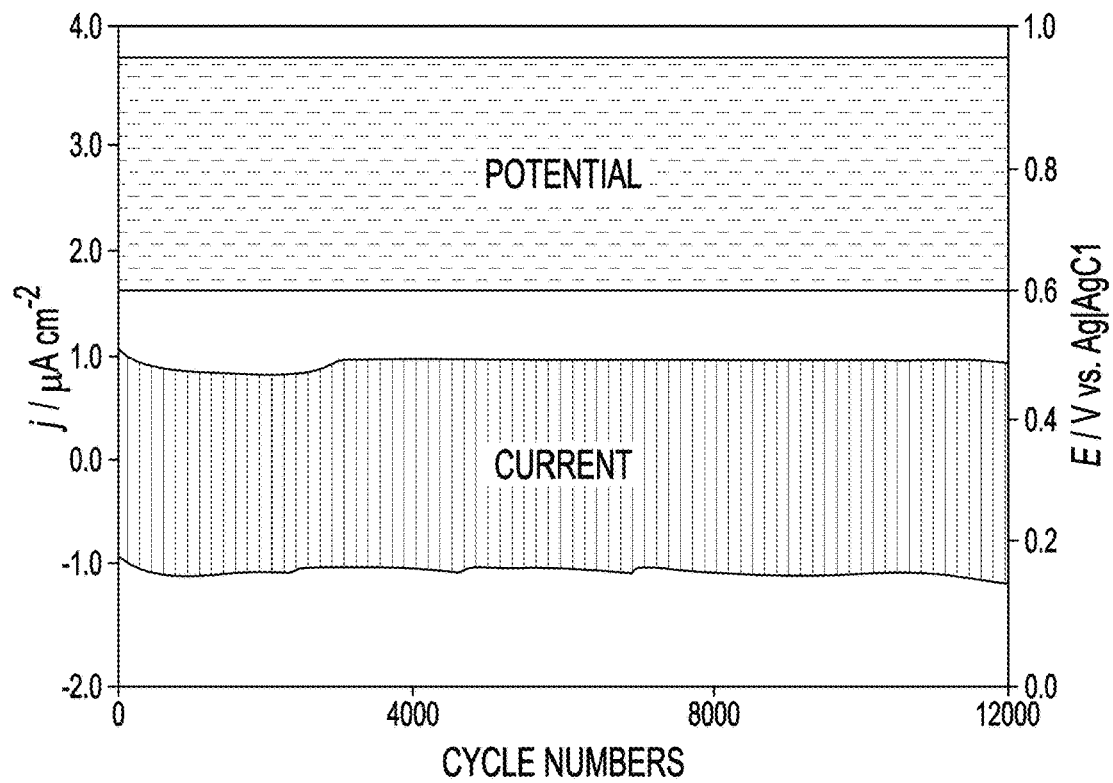
FIG. 8A illustrates a plot of j/µA·cm−2 and E/V vs. Ag|AgCl for an accelerated degradation study carried out in $O_2$-saturated $H_2SO_4$ solution for MTO, in accordance with various embodiments.
Figure 8B:
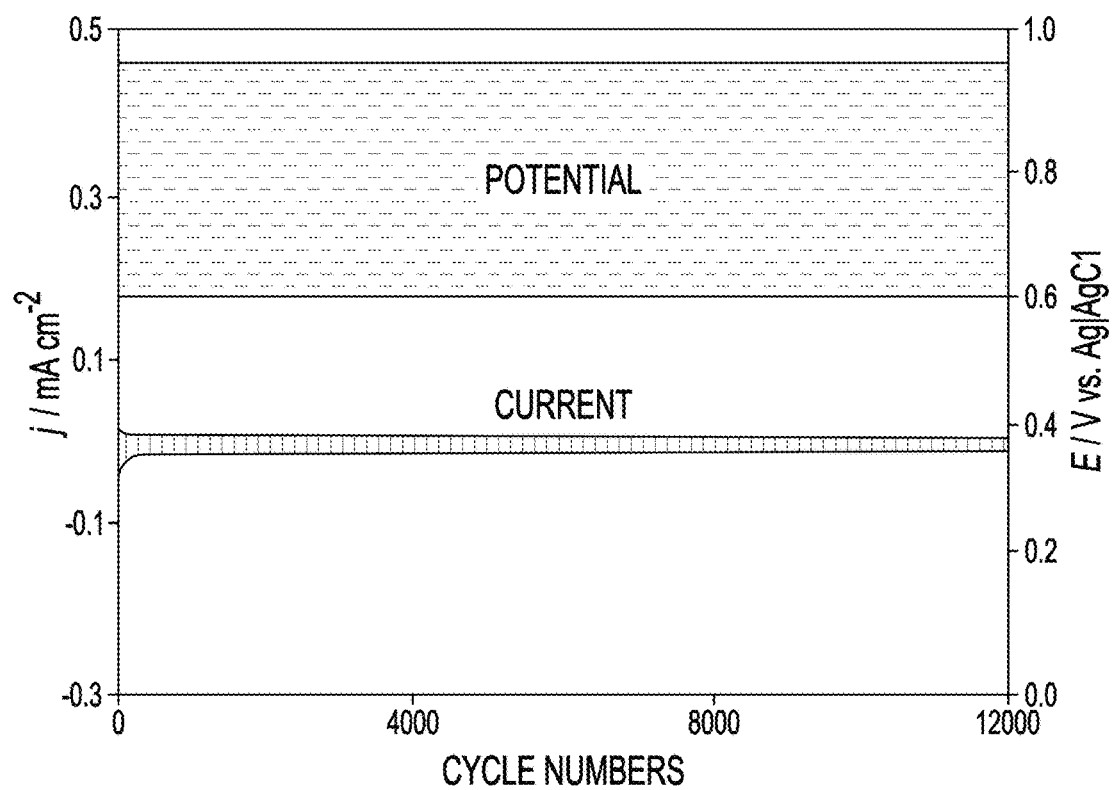
FIG. 8B illustrates a plot of j/µA·cm−2 and E/V vs. Ag|AgCl for an accelerated degradation study carried out in $O_2$-saturated $H_2SO_4$ solution for Pt/MTO, in accordance with various embodiments.
Figure 8C:
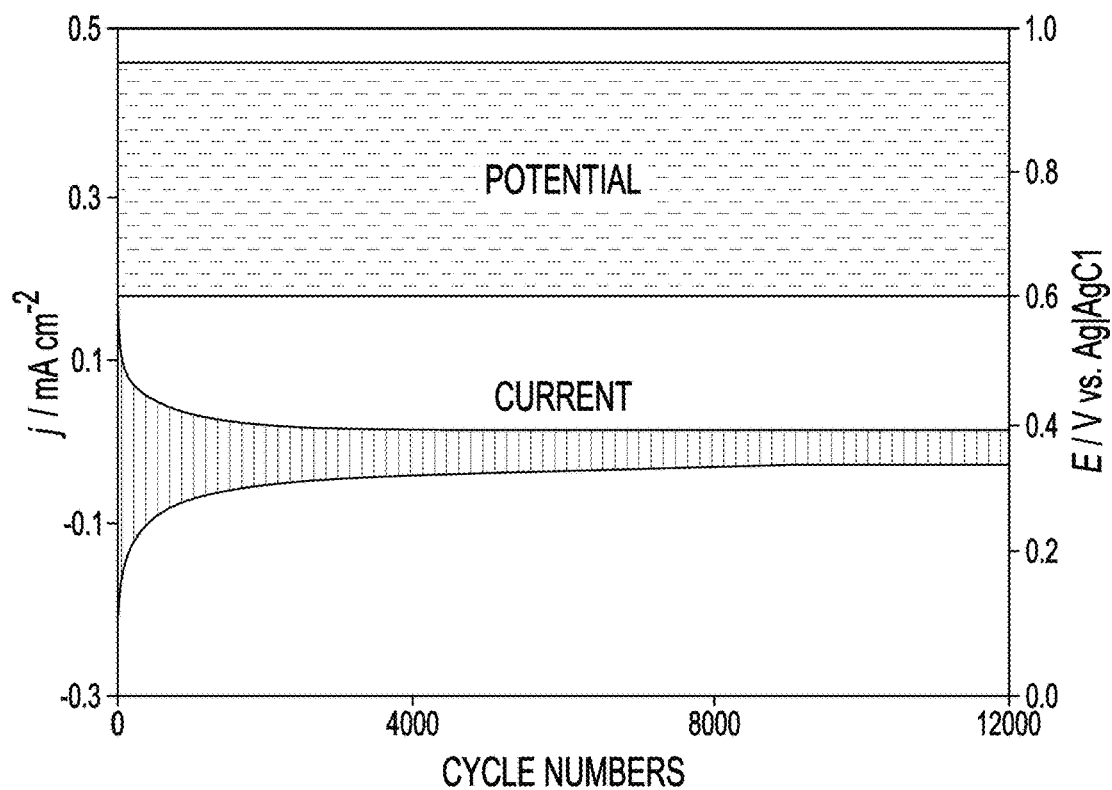
FIG. 8C illustrates a plot of j/µA·cm−2 and E/V vs. Ag|AgCl for an accelerated degradation study carried out in $O_2$-saturated $H_2SO_4$ solution for Pt/C, in accordance with various embodiments.
Figure 8D:
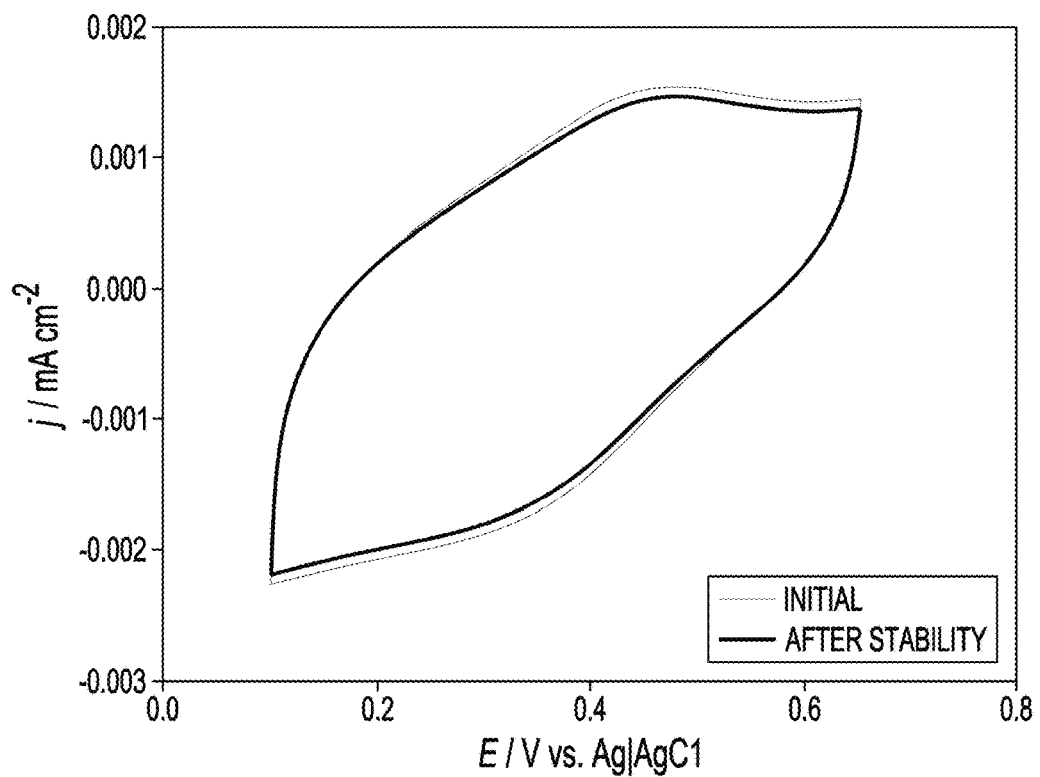
FIG. 8D illustrates a cyclic voltammogram of MTO before and after accelerated degradation, in accordance with various embodiments.

Accelerated stability test. Next to catalytic activity, the stability of potential fuel cell catalysts is an important issue. Thus, the accelerated stability of support (MTO) and catalysts (Pt/C and Pt-MTO) were evaluated for 12000 cycles according to protocol shown in the FIG. 7. In the protocol, initial CVs were performed in $N_2$-saturated 0.5 M $H_2SO_4$, followed by ORR, stability for 12000 cycles, ORR at $O_2$-saturated and finally CVs again in $N_2$-saturated 0.5 M $H_2SO_4$ solution. FIG. 8A shows accelerated stability at the support, MTO material for 12000 cycles by switching potential from 0.95 V to 0.6 V. No degradation of current was observed throughout the 12000 cycles indicating the excellent stability of MTO. The stability of the support was further confirmed by comparing the initial and after stability CVs as shown in FIG. 8D, where almost superimposable CVs were obtained.

Figure 8E:
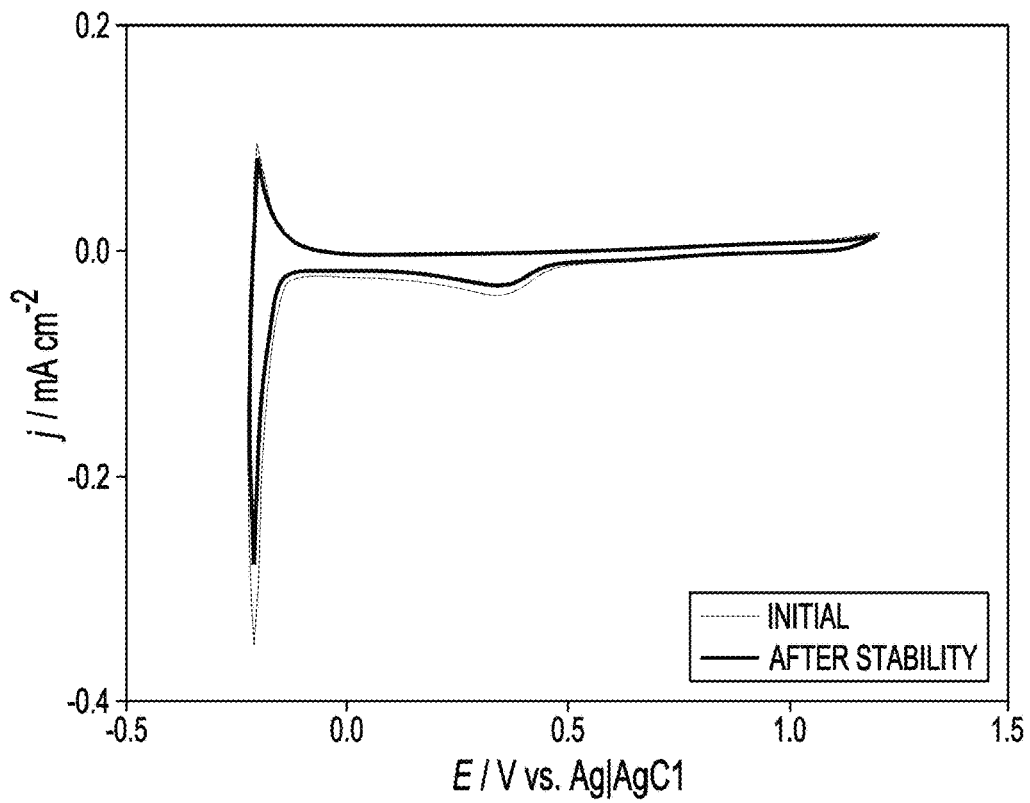
FIG. 8E illustrates a cyclic voltammogram of Pt/MTO before and after accelerated degradation, in accordance with various embodiments.
Figure 8F:
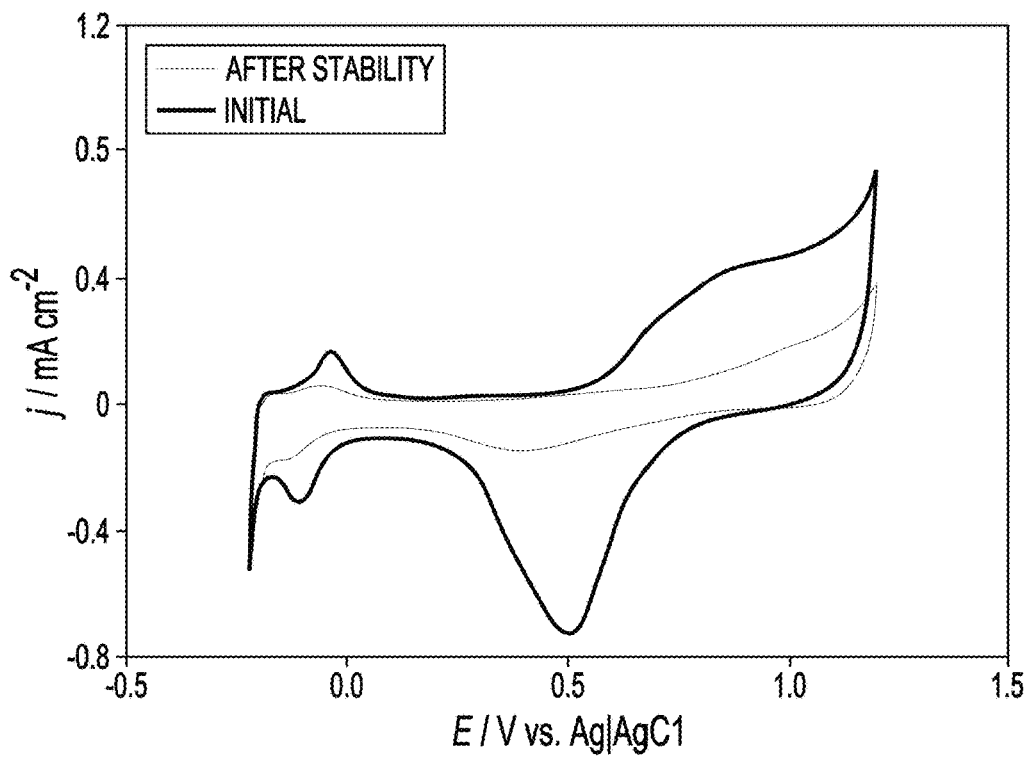
FIG. 8F illustrates a cyclic voltammogram of Pt/C before and after accelerated degradation, in accordance with various embodiments.
Figure 8G:
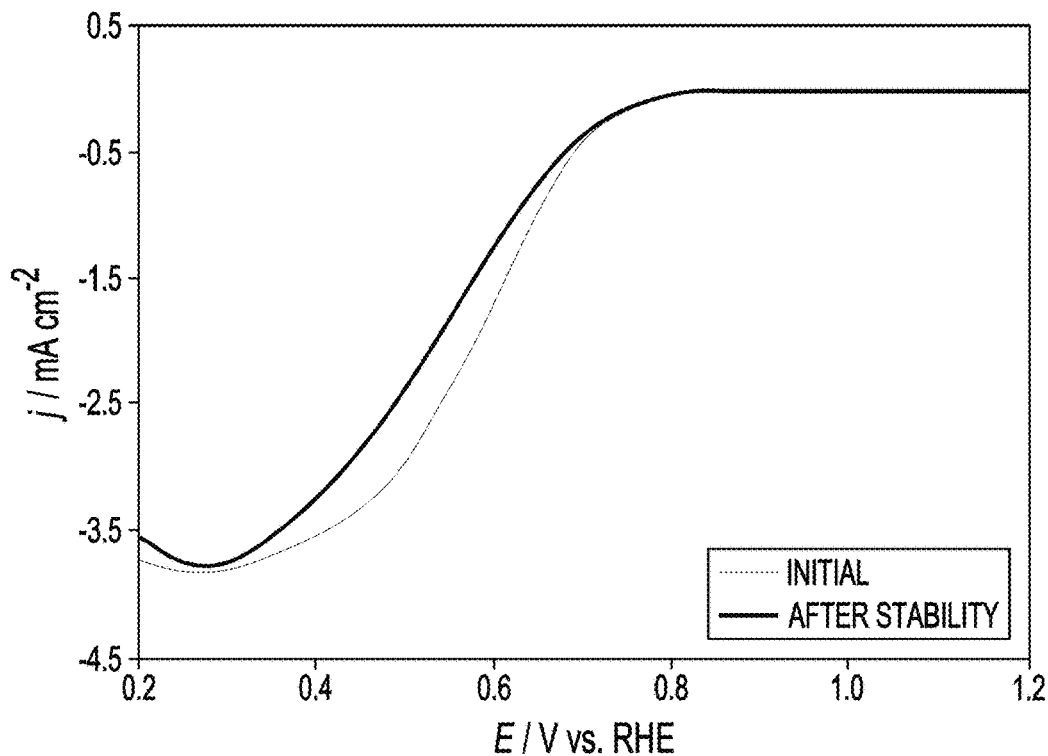
FIG. 8G illustrates an ORR polarization curve for Pt/C before and after accelerated degradation, in accordance with various embodiments.
Figure 8H:
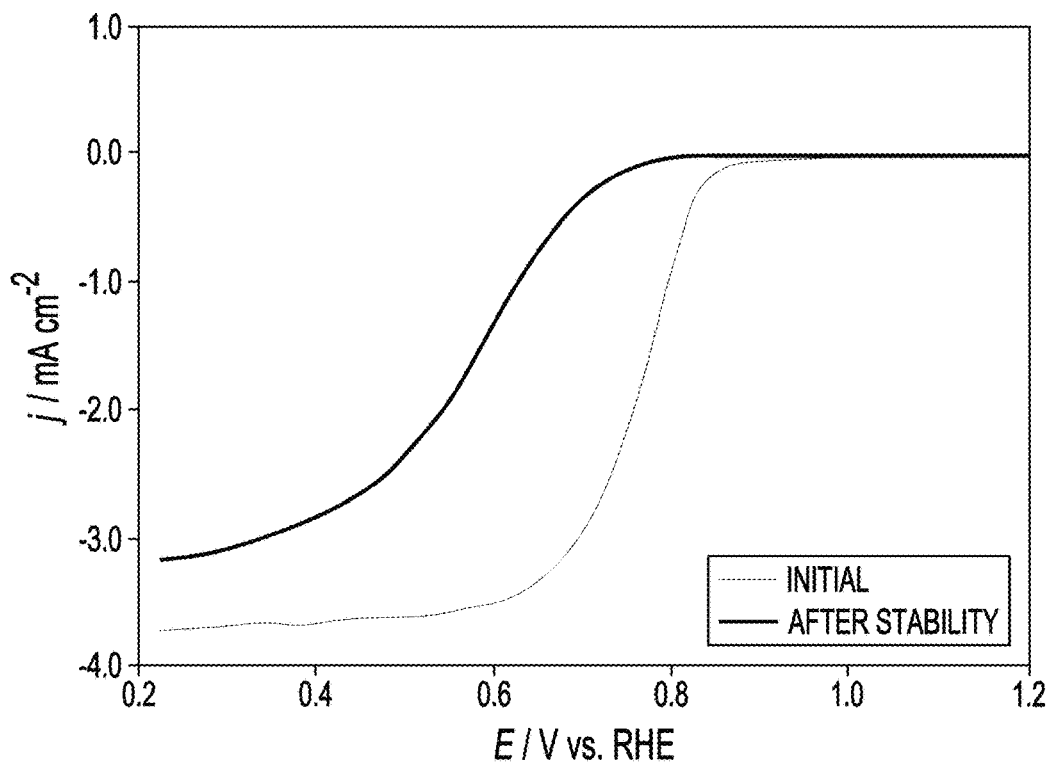
FIG. 8H illustrates an ORR polarization curve for Pt/MTO before and after accelerated degradation, in accordance with various embodiments.
Figure 8I:
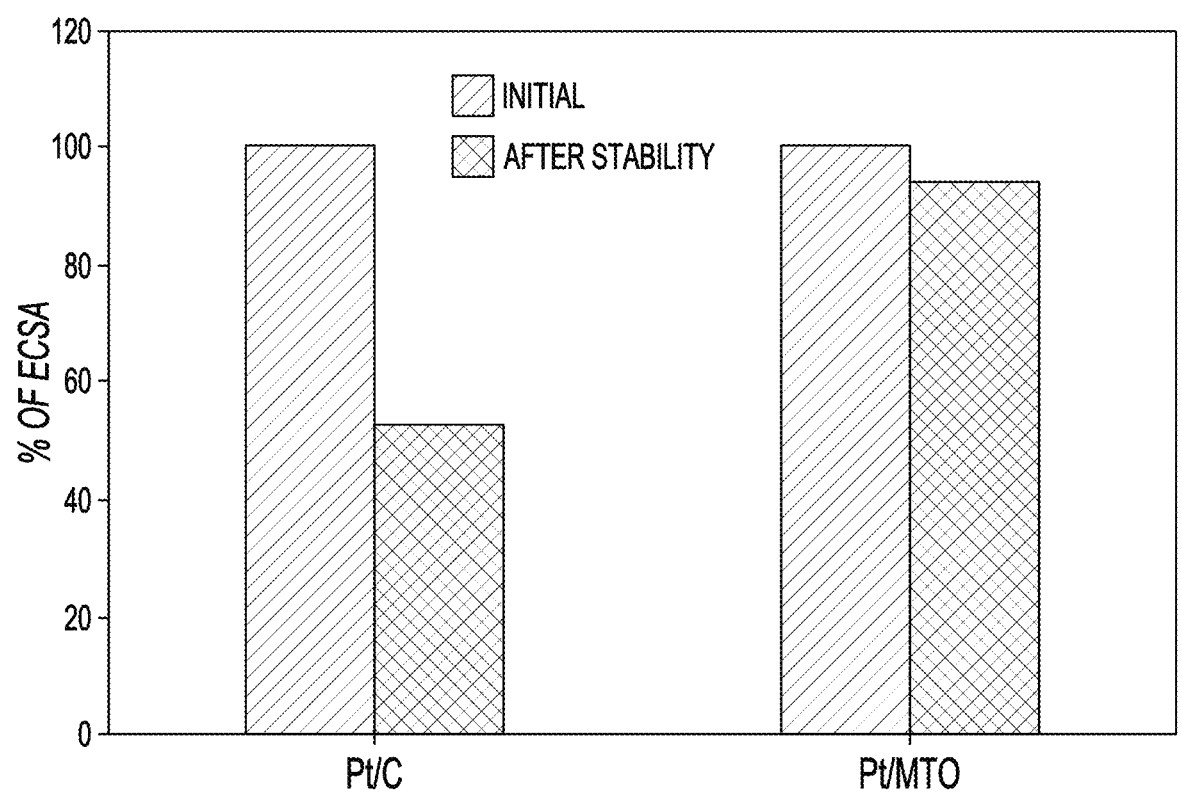
FIG. 8I illustrates % ECSA before and after accelerated degradation for Pt/C and Pt/MTO, in accordance with various embodiments.

Then, Pt-MTO was exposed to an accelerated stability test which consists of 12000 potential cycles in $O_2$-saturated solution and was compared to the state-of-the-art Pt/C (7b and 7c). FIG. 8B-8C show selected cycles during the stress test for Pt-MTO in FIG. 8B and Pt/C in FIG. 8C. In FIG. 8B current remains almost constant even after 12000 cycles of degradation indicating the enhanced stability of catalyst. However, the current significantly decreased with time of stability testing in the state-of-the-art Pt/C indicating degradation of catalyst (FIG. 8C). The CVs obtained at MTO (FIG. 8D) and Pt-MTO (FIG. 8E) were identical when compared with the before and after 12000 cycles of degradation, whereas a significant difference CVs were obtained before and after stability at Pt/C (FIG. 8F). The indications of catalyst degradation became apparent by calculating the electroactive Pt surface. FIG. 8I compares the ECSA losses for both catalysts. The ECSA decrease at Pt-MTO by 7% whereas at Pt/C by almost 50% from the initial values. Thus, the decrease of ECSA at the state-of-the-art Pt/C indicating the least stable catalyst during fuel cell operating condition. A further analysis of catalyst degradation is carried out by comparing ORR polarization curves at 1200 rpm and cyclic voltammetry at $N_2$-saturated $H_2SO_4$ solution. The onset potential of ORR at Pt-MTO (FIG. 8G) remains the same before and after the stability, whereas the onset potential at Pt/C (FIG. 8H) shifted to higher reductive potential after stability confirming the degradation at Pt/C. Furthermore, FIG. 8H shows a limiting current being decreased at Pt/C after stability testing, whereas the diffusion limited current density of Pt-MTO in FIG. 8G remains unchanged. A platinum dissolution and agglomeration are well-known degradation paths leading to such effects at Pt/C, which suggested carbon itself is not a perfect support material. On the other hand, less than 10% degradation ORR performance is observed, indicating a good and alternative support material for Pt in fuel cell application.

Conclusions. In the present study, we have successfully fabricated a novel support, MTO for Pt electrocatalyst for ORR. Like Pt/C, Pt-MTO exhibits 4e⁻ ORR process in $O_2$-saturated 0.5 M $H_2SO_4$. The durability of a Pt-MTO under actual operating condition were demonstrated and compared to those of a state-of-the-art Pt/C catalyst. The Pt-MTO could be operated stably for more than 12000 cycles than the Pt/C. The results indicate that the Pt-MTO exhibits greater stability for both the ECSA and ORR activity. A post-cycling analysis of the tested electrode clearly revealed that the high stability of Pt-MTO is due to the robustness of the MTO support.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Aspects

The following exemplary aspects are provided, the numbering of which is not to be construed as designating levels of importance:

Aspect 1 provides a composite comprising:
a silica phase and a titanium magneli phase.

Aspect 2 provides the composite of Aspect 1, wherein the silica phase is 10 wt % to 90 wt % of the composite.

Aspect 3 provides the composite of any one of Aspects 1-2, wherein the silica phase is 40 wt % to 60 wt % of the composite.

Aspect 4 provides the composite of any one of Aspects 1-3, wherein the silica phase is 90 wt % to 100 wt % $SiO_2$.

Aspect 5 provides the composite of any one of Aspects 1-4, wherein the silica phase is 99 wt % to 100 wt % $SiO_2$.

Aspect 6 provides the composite of any one of Aspects 1-5, wherein the titanium magneli phase is 10 wt % to 90 wt % of the composite.

Aspect 7 provides the composite of any one of Aspects 1-6, wherein the titanium magneli phase is 40 wt % to 60 wt % of the composite.

Aspect 8 provides the composite of any one of Aspects 1-7, wherein the composite has a molar ratio of the titanium magneli phase to the silica phase of 1:0.1 to 1:10.

Aspect 9 provides the composite of any one of Aspects 1-8, wherein the composite has a molar ratio of the titanium magneli phase to the silica phase of 1:1.2 to 1:1.4.

Aspect 10 provides the composite of any one of Aspects 1-9, wherein the titanium magneli phase comprises one or more magneli-phase titanium suboxides having the formula $Ti_xO_{2x-1}$, wherein x is an integer that is in the range of 2 to 15.

Aspect 11 provides the composite of Aspect 10, wherein the titanium magneli phase comprises $Ti_2O_3$, $Ti_3O_5$, $Ti_4O_7$, $Ti_5O_9$, $Ti_6O_{11}$, $Ti_7O_{13}$, $Ti_8O_{15}$, $Ti_9O_{17}$, $Ti_{10}O_{19}$, or a combination thereof.

Aspect 12 provides the composite of any one of Aspects 10-11, wherein the titanium magneli phase comprises $Ti_6O_{11}$.

Aspect 13 provides the composite of any one of Aspects 10-12, wherein the one or more magneli-phase titanium suboxides are 30 wt % to 100 wt % of the titanium magneli phase.

Aspect 14 provides the composite of any one of Aspects 10-13, wherein the one or more magneli-phase titanium suboxides are 50 wt % to 100 wt %, or 90 wt % to 100 wt %, of the titanium magneli phase Aspect 15 provides the composite of any one of Aspects 10-14, wherein the titanium magneli phase further comprises $TiO_2$.

Aspect 16 provides the composite of Aspect 15, wherein the $TiO_2$ is 0.001 wt % to 70 wt % of the titanium magneli phase.

Aspect 17 provides the composite of any one of Aspects 15-16, wherein the $TiO_2$ is 0.001 wt % to 50 wt %, or 0.001 wt % to 10 wt %, of the titanium magneli phase.

Aspect 18 provides the composite of any one of Aspects 1-17, wherein the silica phase and the titanium magneli phase are homogeneously distributed throughout the composite.

Aspect 19 provides the composite of any one of Aspects 1-18, wherein the silica phase and the titanium magneli phase are heterogeneously distributed with respect to each other.

Aspect 20 provides the composite of any one of Aspects 1-19, wherein the silica phase and the titanium magneli phase are each distinct discontinuous particulate crystalline phases in the composite.

Aspect 21 provides the composite of any one of Aspects 1-20, where the silica phase is a particulate crystalline phase in the composite having a mean particle size of 10 nm to 60 nm.

Aspect 22 provides the composite of any one of Aspects 1-21, where the silica phase is a particulate crystalline phase in the composite having a mean particle size of 30 nm to 40 nm.

Aspect 23 provides the composite of any one of Aspects 1-22, where the titanium magneli phase is a particulate crystalline phase in the composite having a mean particle size of 1 nm to 30 nm.

Aspect 24 provides the composite of any one of Aspects 1-23, where the titanium magneli phase is a particulate crystalline phase in the composite having a mean particle size of 5 nm to 10 nm.

Aspect 25 provides the composite of any one of Aspects 1-24, wherein the composite is in the form of particles.

Aspect 26 provides the composite of Aspect 25, wherein the particles have a particle size of 10 nm to 150 nm.

Aspect 27 provides the composite of any one of Aspects 25-26, wherein the particles have a particle size of 30 nm to 70 nm.

Aspect 28 provides the composite of any one of Aspects 1-27, wherein the composite has an electrochemical surface area of 1 $m^2/g$ to 4 $m^2/g$.

Aspect 29 provides the composite of any one of Aspects 1-28, wherein the composite has an electrochemical surface area of 2.4 $m^2/g$ to 2.8 $m^2/g$.

Aspect 30 provides the composite of any one of Aspects 1-29, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the composite has a degradation in current of 0% to 10%.

Aspect 31 provides the composite of any one of Aspects 1-30, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the composite has no degradation in current.

Aspect 32 provides the composite of any one of Aspects 1-31, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the composite has a degradation in electrochemical surface area of 0% to 20%.

Aspect 33 provides the composite of any one of Aspects 1-32, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the composite has a degradation in electrochemical surface area of 5% to 10%.

Aspect 34 provides the composite of any one of Aspects 1-33, wherein the composite is for use as a catalyst support in an electrode.

Aspect 35 provides a composite comprising:
a silica phase and a titanium magneli phase, wherein the titanium magneli phase and the silica phase are each distinct discontinuous particulate crystalline phases in the composite, the silica phase comprises $SiO_2$, $Ti_6O_{11}$ is 30 wt % to 100 wt % of the titanium magneli phase, the silica phase is 40 wt % to 60 wt % of the composite and has a mean particle size of 10 nm to 60 nm, the titanium magneli phase is 40 wt % to 60 wt % of the composite and has a mean particle size of 1 nm to 30 nm.

Aspect 36 provides an electrode comprising:
supported catalyst particles comprising
the composite of any one of Aspects 1-35, and
catalyst particles homogeneously distributed in the composite;
wherein
the catalyst particles are optionally Pt, Pd, Ni, Au, Co, Ru, Ir, Nb, or a combination thereof, and
the catalyst particles are optionally platinum.

Aspect 37 provides the electrode of Aspect 36, wherein the electrode further comprises one or more ionomeric polymers.

Aspect 38 provides the method of Aspect 37, wherein the one or more ionomeric polymers are 1 wt % to 50 wt % of the electrode.

Aspect 39 provides the method of any one of Aspects 37-38, wherein the one or more ionomeric polymers are 1 wt % to 10 wt % of the electrode.

Aspect 40 provides the method of any one of Aspects 36-39, wherein the supported catalyst particles are 50 wt % to 100 wt % of the electrode.

Aspect 41 provides the method of any one of Aspects 36-40, wherein the supported catalyst particles are 90 wt % to 100 wt % of the electrode.

Aspect 42 provides the electrode of any one of Aspects 36-41, wherein the electrode further comprises a binder additive.

Aspect 43 provides the electrode of any one of Aspects 36-42, wherein the catalyst particles have a particle size of 1 nm to 1,000 nm.

Aspect 44 provides the electrode of any one of Aspects 36-43, wherein the catalyst particles have a particle size of 5 nm to 200 nm.

Aspect 45 provides the electrode of any one of Aspects 36-44, wherein the composite is 40 wt % to 95 wt % of the supported catalyst particles.

Aspect 46 provides the electrode of any one of Aspects 36-45, wherein the composite is 60 wt % to 80 wt % of the supported catalyst particles.

Aspect 47 provides the electrode of any one of Aspects 36-46, wherein the catalyst particles are 5 wt % to 60 wt % of the supported catalyst particles.

Aspect 48 provides the electrode of any one of Aspects 36-47, wherein the catalyst particles are 20 wt % to 40 wt % of the supported catalyst particles.

Aspect 49 provides the electrode of any one of Aspects 36-48, wherein the electrode has an electrochemical surface area of 1 $m^2/g$ to 4 $m^2/g$.

Aspect 50 provides the electrode of any one of Aspects 36-49, wherein the electrode has an electrochemical surface area of 2.9 $m^2/g$ to 3.3 $m^2/g$.

Aspect 51 provides the electrode of any one of Aspects 36-50, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode has a degradation in current of 0% to 10%.

Aspect 52 provides the electrode of any one of Aspects 36-51, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode has no degradation in current.

Aspect 53 provides the electrode of any one of Aspects 36-52, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode has a degradation in electrochemical surface area of 0% to 20%.

Aspect 54 provides the electrode of any one of Aspects 36-53, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode has a degradation in electrochemical surface area of 5% to 10%.

Aspect 55 provides the electrode of any one of Aspects 36-54, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode has a degradation of onset potential of oxygen reduction reaction of 0% to 20%.

Aspect 56 provides the electrode of any one of Aspects 36-55, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the electrode has a degradation of onset potential of oxygen reduction reaction of 1% to 15%.

Aspect 57 provides an electrode comprising:
supported platinum particles comprising
a composite comprising a silica phase and a titanium magneli phase, wherein the titanium magneli phase and the silica phase are each distinct discontinuous particulate crystalline phases in the composite, the silica phase comprises $SiO_2$, $Ti_6O_{11}$ is 30 wt % to 100 wt % of the titanium magneli phase, the silica phase is 40 wt % to 60 wt % of the composite and has a mean particle size of 10 nm to 60 nm, the titanium magneli phase is 40 wt % to 60 wt % of the composite and has a mean particle size of 1 nm to 30 nm, and
platinum particles homogeneously distributed in the composite.

Aspect 58 provides an electrochemical cell comprising an anode;
a cathode; and
a proton-exchange membrane between the anode and cathode;
wherein one or both of the anode and the cathode comprise the electrode of any one of Aspects 36-57.

Aspect 59 provides the electrochemical cell of Aspect 58, wherein the electrochemical cell is a fuel cell, an ammonia-forming cell, or a water-electrolysis cell.

Aspect 60 provides the electrochemical cell of Aspect 58, wherein the electrochemical cell is a fuel cell.

Aspect 61 provides a fuel cell comprising
an anode;
a cathode; and
a proton-exchange membrane between the anode and cathode;
wherein one or both of the anode and the cathode comprise supported platinum particles comprising a composite comprising a silica phase and a titanium magneli phase, wherein the silica phase and the titanium magneli phase are each distinct particulate crystalline phases in the composite, and
platinum particles homogeneously distributed in the composite.

Aspect 62 provides a method of making the composite of any one of Aspects 1-35, the method comprising:
combining $SiO_2$ and $TiO_2$ to form a mixture;
reducing the mixture to form the composite of any one of Aspects 1-35.

Aspect 63 provides the method of Aspect 62, wherein combining the $SiO_2$ and the $TiO_2$ to form the mixture comprises combining the $SiO_2$ and the $TiO_2$ in a solvent with mixing.

Aspect 64 provides the method of any one of Aspects 62-63, wherein reducing the mixture comprises reducing the mixture under heating with $H_2$.

Aspect 65 provides the method of Aspect 64, wherein the heating comprises 900° C. to 1300° C.

Aspect 66 provides the method of any one of Aspects 64-65, wherein the heating comprises 1000° C. to 1100° C.

Aspect 67 provides a method of making the electrode of any one of Aspects 36-57, the method comprising:
combining catalyst particles and the composite of any one of Aspects 1-35 to form the supported catalyst particles.

Aspect 68 provides the method of Aspect 67, wherein the combining comprises combining the catalyst particles and the composite in a dry state.

Aspect 69 provides the method of any one of Aspects 67-68, wherein the combining comprises mechanical mixing.

Aspect 70 provides the method of any one of Aspects 67-69, wherein the combining comprises combining the catalyst particles and the composite in a mortar and pestle.

Aspect 71 provides the method of any one of Aspects 67-70, further comprising combining the supported catalyst particles with the one or more ionomeric polymers to form the electrode.

Aspect 72 provides a method of using the electrochemical cell of any one of Aspects 58-60, the method comprising:
generating or applying a voltage across the anode and cathode of the electrochemical cell.

Aspect 73 provides a method of using the fuel cell of Aspect 61, the method comprising:
generating a voltage across the anode and cathode of the fuel cell.

What is claimed is:

1. A composite comprising:
a silica phase and a titanium magneli phase, wherein $Ti_6O_{11}$ is 30 wt % to 100 wt % of the titanium magneli phase.

2. The composite of claim 1, wherein the silica phase is 10 wt % to 90 wt % of the composite, and wherein the titanium magneli phase is 10 wt % to 90 wt % of the composite.

3. The composite of claim 1, wherein the silica phase is 90 wt % to 100 wt % $SiO_2$.

4. The composite of claim 1, wherein the titanium magneli phase further comprises one or more magneli-phase titanium suboxides in addition to the $Ti_6O_{11}$, the one or more magneli-phase titanium suboxides having the formula $Ti_xO_{2x-1}$, wherein x is an integer that is in the range of 2 to 15.

5. The composite of claim 1, wherein the titanium magneli phase further comprises $TiO_2$, wherein the $TiO_2$ is 0.001 wt % to 70 wt % of the titanium magneli phase.

6. The composite of claim 1, wherein the silica phase and the titanium magneli phase are each homogeneously distributed distinct discontinuous particulate crystalline phases in the composite.

7. The composite of claim 1, where the silica phase is a particulate crystalline phase in the composite having a mean particle size of 10 nm to 60 nm.

8. The composite of claim 1, where the titanium magneli phase is a particulate crystalline phase in the composite having a mean particle size of 1 nm to 30 nm.

9. The composite of claim 1, wherein when subjected to an accelerated stability test comprising cyclic voltammetry in $N_2$-saturated 0.5 M $H_2SO_4$, oxygen reduction reaction at 400 to 2000 rpm, 12,000 cycles of switching potential from 0.95 V to 0.6 V, oxygen reduction reaction at 400 to 2000 rpm, and cyclic voltammetry in $N_2$-saturated 0.5 M $H_2SO_4$, the composite has a degradation in electrochemical surface area of 0% to 20%.

10. A composite comprising:
a silica phase and a titanium magneli phase, wherein the titanium magneli phase and the silica phase are each distinct discontinuous particulate crystalline phases in the composite, the silica phase comprises $SiO_2$, $Ti_6O_{11}$ is 30 wt % to 100 wt % of the titanium magneli phase, the silica phase is 40 wt % to 60 wt % of the composite and has a mean particle size of 10 nm to 60 nm, the titanium magneli phase is 40 wt % to 60 wt % of the composite and has a mean particle size of 1 nm to 30 nm.

11. An electrode comprising:
supported catalyst particles comprising
the composite of claim 1, and
catalyst particles homogeneously distributed in the composite.

12. The electrode of claim 11, wherein the catalyst particles comprise platinum particles.

13. An electrode comprising:
supported platinum particles comprising
a composite comprising a silica phase and a titanium magneli phase, wherein the titanium magneli phase and the silica phase are each distinct discontinuous particulate crystalline phases in the composite, the silica phase comprises $SiO_2$, $Ti_6O_{11}$ is 30 wt % to 100 wt % of the titanium magneli phase, the silica phase is 40 wt % to 60 wt % of the composite and has a mean particle size of 10 nm to 60 nm, the titanium magneli phase is 40 wt % to 60 wt % of the composite and has a mean particle size of 1 nm to 30 nm, and
platinum particles homogeneously distributed in the composite.

14. An electrochemical cell comprising an anode;
a cathode; and
a proton-exchange membrane between the anode and cathode;
wherein one or both of the anode and the cathode comprise the electrode of claim 11.

15. The electrochemical cell of claim 14, wherein the electrochemical cell is a fuel cell, an ammonia-forming cell, or a water-electrolysis cell.

16. A fuel cell comprising
an anode;
a cathode; and
a proton-exchange membrane between the anode and cathode;
wherein one or both of the anode and the cathode comprise supported platinum particles comprising
the composite of claim 1, wherein the silica phase and the titanium magneli phase are each distinct particulate crystalline phases in the composite, and
platinum particles homogeneously distributed in the composite.

17. A method of making the composite of claim 1, the method comprising:
combining $SiO_2$ and $TiO_2$ to form a mixture;
reducing the mixture to form the composite of claim 1.

18. A method of using the electrochemical cell of claim 14, the method comprising:
generating or applying a voltage across the anode and cathode of the electrochemical cell.

19. The composite of claim 1, wherein the silica phase is 90 wt % to 100 wt % $SiO_2$, and wherein the composite has a molar ratio of the titanium magneli phase to the silica phase of 1:1.2 to 1:1.4.

20. The electrode of claim 12, wherein the supported catalyst particles have an electrochemical surface area of 2 $m^2/g$ to 3.2 $m^2/g$.

* * * * *

UNITED STATES PATENT AND TRADEMARK OFFICE
CERTIFICATE OF CORRECTION

| | |
|---|---|
| PATENT NO. | : 12,294,093 B2 |
| APPLICATION NO. | : 17/933311 |
| DATED | : May 6, 2025 |
| INVENTOR(S) | : Thakare et al. |

Page 1 of 1

It is certified that error appears in the above-identified patent and that said Letters Patent is hereby corrected as shown below:

In the Claims

In Column 19, Line 5, in Claim 7, delete "where" and insert --wherein-- therefor In Column 19, Line 8, in Claim 8, delete "where" and insert --wherein-- therefor In Column 19, Line 31, in Claim 11, after "comprising", delete a linebreak In Column 19, Line 38, in Claim 13, after "comprising", delete a linebreak In Column 20, Line 7, in Claim 14, after "comprising", insert --:--

In Column 20, Line 7, in Claim 14, before "an anode;", insert a linebreak

In Column 20, Line 17, in Claim 16, after "comprising", insert --:--

In Column 20, Line 23, in Claim 16, after "comprising", insert --:--

Signed and Sealed this
Sixteenth Day of December, 2025

John A. Squires
*Director of the United States Patent and Trademark Office*